(12) United States Patent
Kikuchi et al.

(10) Patent No.: US 11,198,375 B2
(45) Date of Patent: Dec. 14, 2021

(54) VEHICLE, VEHICLE CONTROL SYSTEM, VEHICLE CONTROL METHOD

(71) Applicant: TOYOTA JIDOSHA KABUSHIKI KAISHA, Toyota (JP)

(72) Inventors: Yoshiaki Kikuchi, Toyota (JP); Junichi Matsumoto, Toyota (JP); Akio Uotani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/113,760

(22) Filed: Dec. 7, 2020

(65) Prior Publication Data
US 2021/0188118 A1    Jun. 24, 2021

(30) Foreign Application Priority Data
Dec. 19, 2019  (JP) .............................. JP2019-229536

(51) Int. Cl.
*B60L 58/12* (2019.01)
*H02J 7/00* (2006.01)
*B60K 6/28* (2007.10)

(52) U.S. Cl.
CPC ............ *B60L 58/12* (2019.02); *H02J 7/0047* (2013.01); *B60K 6/28* (2013.01); *B60Y 2200/91* (2013.01); *B60Y 2200/92* (2013.01)

(58) Field of Classification Search
CPC .... B60L 58/15; B60L 2240/549; B60L 58/14; B60L 58/12; B60Y 2200/92; B60Y 2200/91; H02J 7/0047; Y02T 10/70; B60K 6/28
See application file for complete search history.

(56) References Cited

U.S. PATENT DOCUMENTS

| 8,880,251 | B2 | 11/2014 | Matsumoto | |
|---|---|---|---|---|
| 2014/0358352 | A1* | 12/2014 | Yamamoto | B60L 58/13 701/22 |
| 2017/0232851 | A1* | 8/2017 | Unno | B60L 58/20 307/10.1 |
| 2018/0262111 | A1* | 9/2018 | Taniguchi | H02M 3/1584 |
| 2020/0108733 | A1* | 4/2020 | Oguma | H02J 7/007 |
| 2021/0214000 | A1* | 7/2021 | Miki | H02P 21/06 |

FOREIGN PATENT DOCUMENTS

| JP | 2010-163061 A | 7/2010 |
|---|---|---|
| JP | 5062041 B2 | 10/2012 |
| JP | 2019-156007 A | 9/2019 |

* cited by examiner

*Primary Examiner* — Jared Fureman
*Assistant Examiner* — Duc M Pham
(74) *Attorney, Agent, or Firm* — Oliff PLC

(57) ABSTRACT

A vehicle includes a battery pack including a secondary battery and a first control device, a second control device provided separately from the battery pack, and a converter. The converter is configured to select a conversion formula from options depending on a situation and use the selected conversion formula to convert at least one of a first current upper limit value and a second current upper limit value into at least one of a first power upper limit value and a second power upper limit value.

9 Claims, 16 Drawing Sheets

VEHICLE, VEHICLE CONTROL SYSTEM, VEHICLE CONTROL METHOD

INCORPORATION BY REFERENCE

The disclosure of Japanese Patent Application No. 2019-229536 filed on Dec. 19, 2019 including the specification, drawings and abstract is incorporated herein by reference in its entirety.

BACKGROUND

1. Technical Field

The present disclosure relates to a vehicle, a vehicle control system, and a vehicle control method.

2. Description of Related Art

Japanese Unexamined Patent Application Publication No. 2019-156007 (JP 2019-156007 A) discloses a control device for controlling input power and output power of a secondary battery mounted on a vehicle using a first power upper limit value (Win) indicating an upper limit value of the input power of the secondary battery and a second power upper limit value (Wout) indicating an upper limit value of the output power of the secondary battery.

SUMMARY

Electrically driven vehicles (for example, electric vehicles or hybrid vehicles) that use a secondary battery as a power source have spread in recent years. In the electrically driven vehicles, when the capacity or the performance of the secondary battery decreases due to battery deterioration or the like, it is conceivable that the secondary battery mounted on the electrically driven vehicle is replaced.

The secondary battery is generally mounted on a vehicle in the form of a battery pack. The battery pack includes a secondary battery, a sensor that detects the state of the secondary battery (for example, current, voltage, and temperature), and a control device. Hereinafter, the control device incorporated in the battery pack may be referred to as "battery electronic control unit (ECU)", and the sensor incorporated in the battery pack may be referred to as "battery sensor". Peripheral devices (for example, a sensor and a control device) suitable for the secondary battery are mounted on the battery pack. The battery pack is maintained so that the secondary battery and its peripheral devices can operate normally. Therefore, when replacing the secondary battery mounted on the vehicle, it is considered preferable to replace not only the secondary battery but the entire battery pack mounted on the vehicle from the viewpoint of vehicle maintenance.

As described in JP 2019-156007 A, there is a known control device that is mounted on a vehicle separately from a battery pack and that controls at least one of the input power and the output power of a secondary battery by using a power upper limit value (hereinafter, also referred to as "power restricting control device"). The power restricting control device is configured to perform at least one of power-based input restriction and power-based output restriction on the secondary battery. The power-based input restriction is a process of controlling the input power of the secondary battery so that the input power of the secondary battery does not exceed the first power upper limit value. The power-based output restriction is a process of controlling the output power of the secondary battery so that the output power of the secondary battery does not exceed the second power upper limit value. In general, a vehicle including a power restricting control device is equipped with a battery pack including a battery ECU that obtains a power upper limit value using a detection value from a battery sensor (hereinafter, also referred to as "power restricting battery pack").

On the other hand, a control device is known that is mounted on a vehicle separately from the battery pack and that controls the current of the secondary battery by using a current upper limit value that indicates an upper limit value of the current of the secondary battery (hereinafter, also referred to as "current restricting control device"). The current restricting control device is configured to perform at least one of current-based input restriction and current-based output restriction on the secondary battery. The current-based input restriction is a process of controlling the input current of the secondary battery so that the input current of the secondary battery does not exceed a first current upper limit value. The current-based output restriction is a process of controlling the output current of the secondary battery so that the output current of the secondary battery does not exceed a second current upper limit value. In general, a vehicle including a current restricting control device is equipped with a battery pack including a battery ECU that obtains a current upper limit value using a detection value from a battery sensor (hereinafter, also referred to as "current restricting battery pack").

Depending on the supply and demand situation (or the stock situation) of the battery pack, the current restricting battery pack may be more easily available than the power restricting battery pack. However, it has not been expected to use a current restricting battery pack and a power restricting control device in combination, so no study has been conducted on means for using a current restricting battery pack and a power restricting control device in combination. Thus, it is difficult to adopt a current restricting battery pack in a vehicle equipped with a power restricting control device.

The present disclosure provides a vehicle, a vehicle control system, and a vehicle control method that can perform at least one of power-based input restriction and power-based output restriction on a secondary battery included in a current restricting battery pack.

A vehicle according to a first aspect of the present disclosure includes a battery pack, a second control device provided separately from the battery pack, and a converter. The battery pack includes a secondary battery, a battery sensor configured to detect a state of the secondary battery, and a first control device. The first control device is configured to use a detection value of the battery sensor to obtain at least one of a first current upper limit value indicating an upper limit value of an input current of the secondary battery and a second current upper limit value indicating an upper limit value of an output current of the secondary battery. The second control device is configured to use at least one of a first power upper limit value indicating an upper limit value of an input power of the secondary battery and a second power upper limit value indicating an upper limit value of an output power of the secondary battery to control at least one of the input power of the secondary battery and the output power of the secondary battery. The converter is configured to select a conversion formula from options depending on a situation and use the conversion formula that has been selected to perform conversion of at least one of the first current upper limit value and the second current upper limit value into at least one of the first power upper limit value and the second power upper limit value.

The vehicle of the first aspect of the present disclosure includes a converter that performs conversion of a current upper limit value (that is, at least one of the first current upper limit value and the second current upper limit value) into a power upper limit value (that is, at least one of the first power upper limit value and the second power upper limit value). Therefore, even when the current restricting battery pack is adopted, the second control device can perform at least one of power-based input restriction and power-based output restriction on the secondary battery included in the battery pack.

The accuracy of the conversion performed by the converter from the current upper limit value to the power upper limit value (hereinafter, also simply referred to as "conversion accuracy") varies depending on the conversion formula used for the conversion. When the conversion accuracy is high, the power upper limit value corresponding to the current upper limit value can be obtained. By controlling the electric power of the secondary battery using the power upper limit value corresponding to the current upper limit value, the increase in the current value of the secondary battery is substantially restricted at the current upper limit value. On the other hand, when the conversion accuracy is low, the power upper limit value obtained by the conversion does not correspond to the current upper limit value. When the electric power of the secondary battery is controlled using such a power upper limit value, the current value is allowed to increase to a current value higher than the current upper limit value, or increase of the current value may be restricted at a current value lower than the current upper limit value.

In order to improve the controllability of the current of the secondary battery, it is desirable to perform the above conversion using a conversion formula with high conversion accuracy. On the other hand, however, the calculation load for conversion tends to be larger as the conversion accuracy of the conversion formula becomes higher.

According to the vehicle of the first aspect of the present disclosure, the conversion formula is selected from the options according to the situation, and the current upper limit value is converted into the power upper limit value using the selected conversion formula. Therefore, in a situation where it is required to severely control the current of the secondary battery, it is possible to enhance the controllability of the current of the secondary battery by selecting a conversion formula with high conversion accuracy. In contrast, in a situation where it is not required to severely control the current of the secondary battery, the calculation load of the converter can be reduced by using (selecting) a conversion formula with a small calculation load (that is, a conversion formula with low conversion accuracy). The options for the conversion formula can be set as desired.

In the vehicle according to the first aspect of the present disclosure, the first control device may be configured to use the detection value of the battery sensor to obtain the first current upper limit value. The second control device may be configured to control the input power of the secondary battery such that the input power of the secondary battery does not exceed the first power upper limit value. The options may include a first conversion formula and a second conversion formula. The first conversion formula is a formula for converting the first current upper limit value into the first power upper limit value by multiplying a measured value of a voltage of the secondary battery by the first current upper limit value. The voltage is detected by the battery sensor. The second conversion formula is a formula for converting the first current upper limit value into the first power upper limit value by multiplying a first estimated voltage value by the first current upper limit value. The first estimated voltage value is a voltage value of the secondary battery in a state in which a current corresponding to the first current upper limit value is flowing through the secondary battery. The converter may be configured to select the second conversion formula when the state of the secondary battery is included in a predetermined first state, and select the first conversion formula when the state of the secondary battery is not included in the first state.

According to the vehicle of the first aspect of the present disclosure, the first conversion formula uses the measured value of the voltage of the secondary battery to convert the first current upper limit value into the first power upper limit value. Since the first conversion formula uses the measured value of the voltage as it is, the first current upper limit value can be converted into the first power upper limit value without performing a complicated calculation.

On the other hand, the second conversion formula uses the first estimated voltage value to convert the first current upper limit value into the first power upper limit value. The voltage of the secondary battery changes depending on the magnitude of the current. The second conversion formula multiplies the first current upper limit value by the first estimated voltage value (that is, the voltage value of the secondary battery in the state where the current corresponding to the first current upper limit value is flowing) described above to convert the first current upper limit value into the first power upper limit value. This makes it possible to acquire the first power upper limit value corresponding to the first current upper limit value with high accuracy.

As described above, it is considered in the second conversion formula that the voltage of the secondary battery changes depending on the magnitude of the current, and the first power upper limit value corresponding to the first current upper limit value can be obtained with higher accuracy in the conversion using the second conversion formula than in the conversion using the first conversion formula. However, even in the conversion using the first conversion formula, the conversion accuracy is ensured to the extent that the current controllability of the secondary battery is not unduly hindered. In the vehicle having the above configuration, for example, when the state of the secondary battery in which it is required to severely control the current of the secondary battery is set as the first state, power-based input restriction is performed using the first power upper limit value converted with the first conversion formula in the normal state (that is, when the state of the secondary battery is not included in the first state), whereby the calculation load of the converter is reduced. On the other hand, in a situation where it is required to severely control the current of the secondary battery (that is, when the state of the secondary battery is included in the first state), power-based input restriction is performed using the first power upper limit value converted with the second conversion formula, whereby the controllability of the input current of the secondary battery can be improved.

In the vehicle according to the first aspect of the present disclosure, the first control device may be configured to use the detection value of the battery sensor to obtain the second current upper limit value. The second control device may be configured to control the output power of the secondary battery such that the output power of the secondary battery does not exceed the second power upper limit value. The options may include a third conversion formula and a fourth conversion formula. The third conversion formula is a formula for converting the second current upper limit value into the second power upper limit value by multiplying a measured value of a voltage of the secondary battery by the second current upper limit value. The voltage is detected by the battery sensor. The fourth conversion formula is a formula for converting the second current upper limit value into the second power upper limit value by multiplying a second estimated voltage value by the second current upper limit value. The second estimated voltage value is a voltage value of the secondary battery in a state in which a current corresponding to the second current upper limit value is flowing through the secondary battery. The converter may be configured to select the fourth conversion formula when the state of the secondary battery is included in a predetermined second state, and select the third conversion formula when the state of the secondary battery is not included in the second state.

The third conversion formula uses the measured value of the voltage of the secondary battery to convert the second current upper limit value into the second power upper limit value. Since the third conversion formula uses the measured value of the voltage as it is, the second current upper limit value can be converted into the second power upper limit value without performing a complicated calculation. The fourth conversion formula uses the voltage value of the secondary battery in the state where the current corresponding to the second current upper limit value is flowing (that is, the second estimated voltage value) to convert the second current upper limit value into the second power upper limit value. Like the above-mentioned second conversion formula, it is considered in the fourth conversion formula that the voltage of the secondary battery changes depending on the magnitude of the current, and the second power upper limit value corresponding to the second current upper limit value can be obtained with higher accuracy in the conversion using the fourth conversion formula than in the conversion using the third conversion formula. However, even in the conversion using the third conversion formula, the conversion accuracy is ensured to the extent that the current controllability of the secondary battery is not unduly hindered. According to the vehicle of the first aspect of the present disclosure, for example, when the state of the secondary battery in which it is required to severely control the current of the secondary battery is set as the second state, power-based output restriction is performed using the second power upper limit value converted with the third conversion formula in the normal state (that is, when the state of the secondary battery is not included in the second state), whereby the calculation load of the converter is reduced. On the other hand, in a situation where it is required to severely control the current of the secondary battery (that is, when the state of the secondary battery is included in the second state), power-based output restriction is performed using the second power upper limit value converted with the fourth conversion formula, whereby the controllability of the output current of the secondary battery can be improved.

The vehicle according to the first aspect of the present disclosure may further include a third control device provided separately from the battery pack and configured to relay communication between the first control device and the second control device. The converter may be mounted on the third control device. The battery pack may be configured to output at least one of the first current upper limit value and the second current upper limit value. The third control device may be configured such that when at least one of the first current upper limit value and the second current upper limit value is input from the battery pack to the third control device, the converter performs the conversion of at least one of the first current upper limit value and the second current upper limit value into at least one of the first power upper limit value and the second power upper limit value. The third control device may be configured to output at least one of the first power upper limit value and the second power upper limit value to the second control device.

According to the vehicle of the first aspect of the present disclosure, the third control device provided separately from the battery pack includes the converter, and the converter converts the current upper limit value into the power upper limit value. Thus, the converter can be mounted on the vehicle without changing in the configurations of the battery pack (including the first control device) and the second control device.

In the vehicle according to the first aspect of the present disclosure, the third control device may be configured to perform the conversion and output at least one of the first power upper limit value and the second power upper limit value when at least one of the first current upper limit value and the second current upper limit value is input, and to output at least one of the first power upper limit value and the second power upper limit value without performing the conversion when at least one of the first power upper limit value and the second power upper limit value is input.

According to the vehicle of the first aspect of the present disclosure, when the vehicle is equipped with the current restricting battery pack, the third control device performs the conversion on the current upper limit value input from the current restricting battery pack and outputs the power upper limit value. On the other hand, when the vehicle is equipped with the power restricting battery pack, the third control device outputs the power upper limit value without performing the conversion on the power upper limit value input from the power restricting battery pack. Therefore, in both a case where the current restricting battery pack is adopted and a case where the power restricting battery pack is adopted, the second control device can perform at least one of power-based input restriction and power-based output restriction on the secondary battery included in the battery pack.

In the vehicle according to the first aspect of the present disclosure, the converter may be mounted on the first control device. The first control device may be configured to perform, with the converter, the conversion of at least one of the first current upper limit value and the second current upper limit value obtained using the detection value of the battery sensor into at least one of the first power upper limit value and the second power upper limit value to output the at least one of the first power upper limit value and the second power upper limit value that has been obtained to the second control device when the first control device is connected to the second control device.

According to the vehicle of the first aspect of the present disclosure, the converter is incorporated in the first control device (that is, inside the battery pack). Thus, the current upper limit value can be converted into the power upper limit value inside the battery pack and the power upper limit value can be output from the battery pack. Therefore, the second control device can appropriately perform at least one of power-based input restriction and power-based output restriction on the secondary battery included in the battery pack without adding the above-mentioned third control device.

In the vehicle according to the first aspect of the present disclosure, the converter may be mounted on the second control device. The battery pack may be configured to output at least one of the first current upper limit value and the second current upper limit value. The second control device may be configured to perform, with the converter, the conversion of at least one of the first current upper limit value and the second current upper limit value that is input from the battery pack into at least one of the first power upper limit value and the second power upper limit value and to use the at least one of the first power upper limit value and the second power upper limit value that has been obtained to control at least one of the input power of the secondary battery and the output power of the secondary battery.

According to the vehicle of the first aspect of the present disclosure, the second control device provided separately from the battery pack includes the converter, and the converter converts the current upper limit value into the power upper limit value. Therefore, the converter can be mounted on the vehicle without a change in the configuration of the battery pack (including the first control device). Further, the second control device can appropriately perform at least one of power-based input restriction and power-based output restriction on the secondary battery included in the battery pack without adding the above-mentioned third control device.

A vehicle control system according to a second aspect of the present disclosure is a vehicle control system configured such that a battery pack is attached to the vehicle control system. The battery pack includes a secondary battery, a battery sensor configured to detect a state of the secondary battery, and a control device configured to use a detection value of the battery sensor to obtain at least one of a first current upper limit value indicating an upper limit value of an input current of the secondary battery and a second current upper limit value indicating an upper limit value of an output current of the secondary battery. The vehicle control system includes a control unit and a conversion unit. The control unit is configured to use at least one of a first power upper limit value indicating an upper limit value of an input power of the secondary battery and a second power upper limit value indicating an upper limit value of an output power of the secondary battery to control at least one of the input power of the secondary battery and the output power of the secondary battery when the battery pack is attached to the vehicle control system. The conversion unit is configured to select a conversion formula from options depending on a situation and to use the conversion formula that has been selected to perform conversion of at least one of the first current upper limit value and the second current upper limit value that is input from the battery pack into at least one of the first power upper limit value and the second power upper limit value, and to output at least one of the first power upper limit value and the second power upper limit value that has been obtained to the control unit.

The vehicle control system according to the second aspect of the present disclosure can perform conversion of the current upper limit value (that is, at least one of the first current upper limit value and the second current upper limit value) into the power upper limit value (that is, at least one of the first power upper limit value and the second power upper limit value) using the appropriate conversion formula depending on the situation. Therefore, even when the current restricting battery pack is adopted, the second control device can appropriately perform at least one of power-based input restriction and power-based output restriction on the secondary battery included in the battery pack.

A vehicle control method according to a third aspect of the present disclosure includes: acquiring, with a vehicle control system to which a battery pack is attached, at least one of a first current upper limit value indicating an upper limit value of an input current of a secondary battery and a second current upper limit value indicating an upper limit value of an output current of the secondary battery from the battery pack, the battery pack including the secondary battery, a battery sensor configured to detect a state of the secondary battery, and a control device configured to use a detection value of the battery sensor to obtain at least one of the first current upper limit value and the second current upper limit value; selecting, with the vehicle control system, a conversion formula from options; performing, with the vehicle control system, conversion of at least one of the first current upper limit value and the second current upper limit value that has been acquired from the battery pack into at least one of a first power upper limit value and a second power upper limit value using the conversion formula that has been selected; and controlling, with the vehicle control system, at least one of an input power of the secondary battery and an output power of the secondary battery using at least one of the first power upper limit value and the second power upper limit value.

The vehicle control method according to the third aspect of the present disclosure can perform conversion of the current upper limit value (that is, at least one of the first current upper limit value and the second current upper limit value) into the power upper limit value (that is, at least one of the first power upper limit value and the second power upper limit value) using the appropriate conversion formula depending on the situation. Therefore, even when the current restricting battery pack is adopted, the second control device can appropriately perform at least one of power-based input restriction and power-based output restriction on the secondary battery included in the battery pack.

With the present disclosure, a vehicle, a vehicle control system, and a vehicle control method that can perform at least one of power-based input restriction and power-based output restriction on a secondary battery included in a current restricting battery pack can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
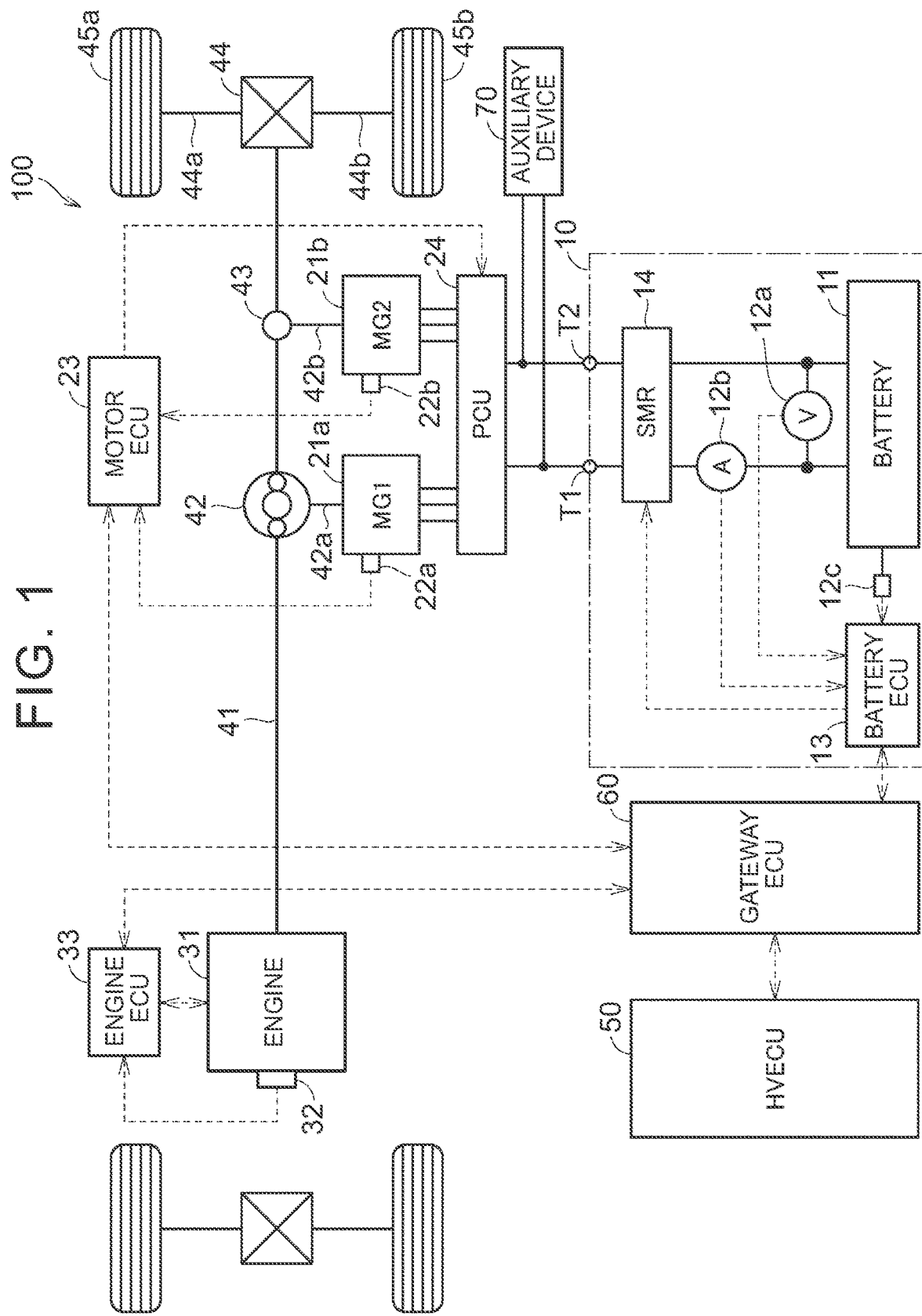
FIG. 1 is a diagram showing a configuration of a vehicle according to an embodiment of the present disclosure.

Embodiments of the present disclosure will be described in detail with reference to the drawings. It should be noted that the same or corresponding parts in the drawings are denoted by the same reference characters and repetitive description thereof will be omitted. Hereinafter, an electronic control unit is also referred to as "ECU".

FIG. 1 is a diagram showing a configuration of a vehicle according to the present embodiment. In the present embodiment, a front-wheel drive four-wheel vehicle (more specifically, a hybrid vehicle) is assumed to be used, but the number of wheels and the drive system can be changed as appropriate. For example, the drive system may be four-wheel drive.

Referring to FIG. 1, the vehicle 100 is equipped with a battery pack 10 including a battery ECU 13. Further, a motor ECU 23, an engine ECU 33, an HV ECU 50, and a gateway ECU 60 are mounted on the vehicle 100 separately from the battery pack 10. The motor ECU 23, the engine ECU 33, the HV ECU 50, and the gateway ECU 60 are located outside the battery pack 10. The battery ECU 13 is located inside the battery pack 10. In the present embodiment, the battery ECU 13, the HV ECU 50, and the gateway ECU 60 can be regarded as examples of a "first control device", a "second control device", and a "third control device" according to the present disclosure, respectively.

The battery pack 10 includes a battery 11, a voltage sensor 12a, a current sensor 12b, a temperature sensor 12c, the battery ECU 13, and a system main relay (SMR) 14. The battery 11 functions as a secondary battery. In the present embodiment, an assembled battery including a plurality of electrically connected lithium ion batteries is adopted as the battery 11. Each secondary battery that constitutes the assembled battery is also referred to as a "cell". In the present embodiment, each lithium ion battery that constitutes the battery 11 corresponds to the "cell". The secondary battery included in the battery pack 10 is not limited to the lithium ion battery and may be another secondary battery (for example, a nickel metal hydride battery). An electrolytic solution secondary battery or an all-solid-state secondary battery may be used as the secondary battery.

The voltage sensor 12a detects the voltage of each cell of the battery 11. The current sensor 12b detects current flowing through the battery 11 (the charging side takes a negative value). The temperature sensor 12c detects the temperature of each cell of the battery 11. The sensors output the detection results to the battery ECU 13. The current sensor 12b is provided in the current path of the battery 11. In the present embodiment, one voltage sensor 12a and one temperature sensor 12c are provided for each cell. However, the present disclosure is not limited to this, and one voltage sensor 12a and one temperature sensor 12c may be provided for each set of multiple cells, or only one voltage sensor 12a and one temperature sensor 12c may be provided for one assembled battery. Hereinafter, the voltage sensor 12a, the current sensor 12b, and the temperature sensor 12c are collectively referred to as "battery sensor 12". The battery sensor 12 may be a battery management system (BMS) that has a state of charge (SOC) estimation function, a state of health (SOH) estimation function, a cell voltage equalization function, a diagnostic function, and a communication function in addition to the above sensor functions.

The SMR 14 is configured to switch connection and disconnection of power paths connecting external connection terminals T1 and T2 of the battery pack 10 and the battery 11. For example, an electromagnetic mechanical relay can be used as the SMR 14. In the present embodiment, a power control unit (PCU) 24 is connected to the external connection terminals T1 and T2 of the battery pack 10. The battery 11 is connected to the PCU 24 via the SMR 14. When the SMR 14 is in the closed state (connected state), power can be transmitted between the battery 11 and the PCU 24. In contrast, when the SMR 14 is in the open state (disconnected state), the power paths connecting the battery 11 and the PCU 24 are disconnected. In the present embodiment, the SMR 14 is controlled by the battery ECU 13. The battery ECU 13 controls the SMR 14 according to an instruction from the HV ECU 50. The SMR 14 is in the closed state (connected state) when vehicle 100 is traveling, for example.

The vehicle 100 includes an engine 31, a first motor generator 21a (hereinafter referred to as "MG 21a"), and a second motor generator 21b (hereinafter referred to as "MG 21b") as power sources for traveling. The MG 21a and the MG 21b are motor generators that have both a function as a motor that outputs torque by receiving drive power and a function as a generator that generates electric power by receiving the torque. An alternating current (AC) motor (for example, a permanent magnet synchronous motor or an induction motor) is used as the MG 21a and the MG 21b. The MG 21a and the MG 21b are electrically connected to the battery 11 via the PCU 24. The MG 21a has a rotor shaft 42a and the MG 21b has a rotor shaft 42b. The rotor shaft 42a corresponds to a rotation shaft of the MG 21a, and the rotor shaft 42b corresponds to a rotation shaft of the MG 21b.

The vehicle 100 further includes a single-pinion planetary gear 42. An output shaft 41 of the engine 31 and the rotor shaft 42a of the MG 21a are connected to the planetary gear 42. The engine 31 is, for example, a spark-ignition internal combustion engine including a plurality of cylinders (for example, four cylinders). The engine 31 combusts fuel (for example, gasoline) in each cylinder to generate drive force, and the generated drive force rotates a crankshaft (not shown) shared by all the cylinders. The crankshaft of the engine 31 is connected to the output shaft 41 via a torsional damper (not shown). The output shaft 41 rotates along with rotation of the crankshaft. The engine 31 is not limited to a gasoline engine and may be a diesel engine.

The planetary gear 42 has three rotating elements, namely, an input element, an output element, and a reaction force element. More specifically, the planetary gear 42 includes a sun gear, a ring gear that is arranged coaxially with the sun gear, a pinion gear that meshes with the sun gear and the ring gear, and a carrier that holds the pinion gear so that the pinion gear can rotate and revolve. The carrier corresponds to the input element, the ring gear corresponds to the output element, and the sun gear corresponds to the reaction force element.

The engine 31 and the MG 21*a* are mechanically connected to each other via the planetary gear 42. The output shaft 41 of the engine 31 is connected to the carrier of the planetary gear 42. The rotor shaft 42*a* of the MG 21*a* is connected to the sun gear of the planetary gear 42. The torque output from the engine 31 is input to the carrier. The planetary gear 42 is configured to divide the torque output from the engine 31 to the output shaft 41 into torque that is transmitted to the sun gear (eventually the MG 21*a*) and torque that is transmitted to the ring gear. When the torque output from the engine 31 is output to the ring gear, reaction torque generated by the MG 21*a* acts on the sun gear.

The planetary gear 42 and the MG 21*b* are configured such that the drive force output from the planetary gear 42 (that is, drive force output to the ring gear) and the drive force output from the MG 21*b* (that is, drive force output to the rotor shaft 42*b*) are combined and transmitted to the drive wheels 45*a* and 45*b*. More specifically, an output gear (not shown) that meshes with a driven gear 43 is attached to the ring gear of the planetary gear 42. A drive gear (not shown) attached to the rotor shaft 42*b* of the MG 21*b* also meshes with the driven gear 43. The driven gear 43 combines the torque output from the MG 21*b* to the rotor shaft 42*b* and the torque output from the ring gear of the planetary gear 42. The drive torque thus combined is transmitted to a differential gear 44 and further transmitted to the drive wheels 45*a* and 45*b* via drive shafts 44*a* and 44*b* extending from the differential gear 44 to the right and left.

The MG 21*a* is provided with a motor sensor 22*a* that detects the state (for example, current, voltage, temperature, and rotation speed) of the MG 21*a*. The MG 21*b* is provided with a motor sensor 22*b* that detects the state (for example, current, voltage, temperature, and rotation speed) of the MG 21*b*. The motor sensors 22*a* and 22*b* output their detection results to the motor ECU 23. The engine 31 is provided with an engine sensor 32 that detects the state of the engine 31 (for example, intake air amount, intake pressure, intake temperature, exhaust pressure, exhaust temperature, catalyst temperature, engine coolant temperature, and engine speed). The engine sensor 32 outputs its detection result to the engine ECU 33.

The HV ECU 50 is configured to output a command (control command) for controlling the engine 31 to the engine ECU 33. The engine ECU 33 is configured to control various actuators of the engine 31 (for example, a throttle valve, an ignition device, and an injector (not shown)) in accordance with the command from the HV ECU 50. The HV ECU 50 can perform engine control through the engine ECU 33.

The HV ECU 50 is configured to output a command (control command) for controlling each of the MG 21*a* and the MG 21*b* to the motor ECU 23. The motor ECU 23 is configured to generate current signals (for example, signals indicating the magnitude and the frequency of the current) that match the target torque of each of the MG 21*a* and the MG 21*b* in accordance with the command from the HV ECU 50, and output the generated current signals to the PCU 24. The HV ECU 50 can perform motor control through the motor ECU 23.

The PCU 24 includes, for example, two inverters each corresponding to the MG 21*a* and the MG 21*b*, and a converter (not shown) arranged between each inverter and the battery 11. The PCU 24 is configured to supply power accumulated in the battery 11 to each of the MG 21*a* and the MG 21*b*, and supply electric power generated by each of the MG 21*a* and the MG 21*b* to the battery 11. The PCU 24 is configured such that the states of the MG 21*a* and the MG 21*b* can be controlled separately, and, for example, the MG 21*b* can be in the power running state while the MG 21*a* is in the regenerative state (that is, the power generation state). The PCU 24 is configured to be able to supply the electric power generated by one of the MG 21*a* and the MG 21*b* to the other. The MG 21*a* and the MG 21*b* are configured to be able to transmit and receive power to and from each other.

The vehicle 100 is configured to perform hybrid vehicle (HV) traveling and electric vehicle (EV) traveling. The HV traveling is traveling performed by operating the engine 31 and the MG 21*b* with the engine 31 generating driving force for travel. The EV traveling is traveling performed by operating the MG 21*b* with the engine 31 stopped. When the engine 31 is stopped, combustion is not performed in the cylinders. When the combustion in the cylinders is stopped, the engine 31 does not generate combustion energy (the driving force for travel). The HV ECU 50 is configured to switch between the EV traveling and the HV traveling depending on the situation.

The vehicle 100 further includes an auxiliary device 70. The auxiliary device 70 is a device that consumes electric power in cases other than EV traveling of the vehicle 100. In the present embodiment, the auxiliary device 70 includes an air conditioner. When the auxiliary device 70 is in the operating state, the electric power of the battery 11 is consumed by the auxiliary device 70.

Although not shown, the vehicle 100 further includes devices (for example, a steering device, an accelerator device, and a braking device) for a user to drive the vehicle 100. In the present embodiment, a hydraulic foot brake is used as the braking device.

Figure 2:
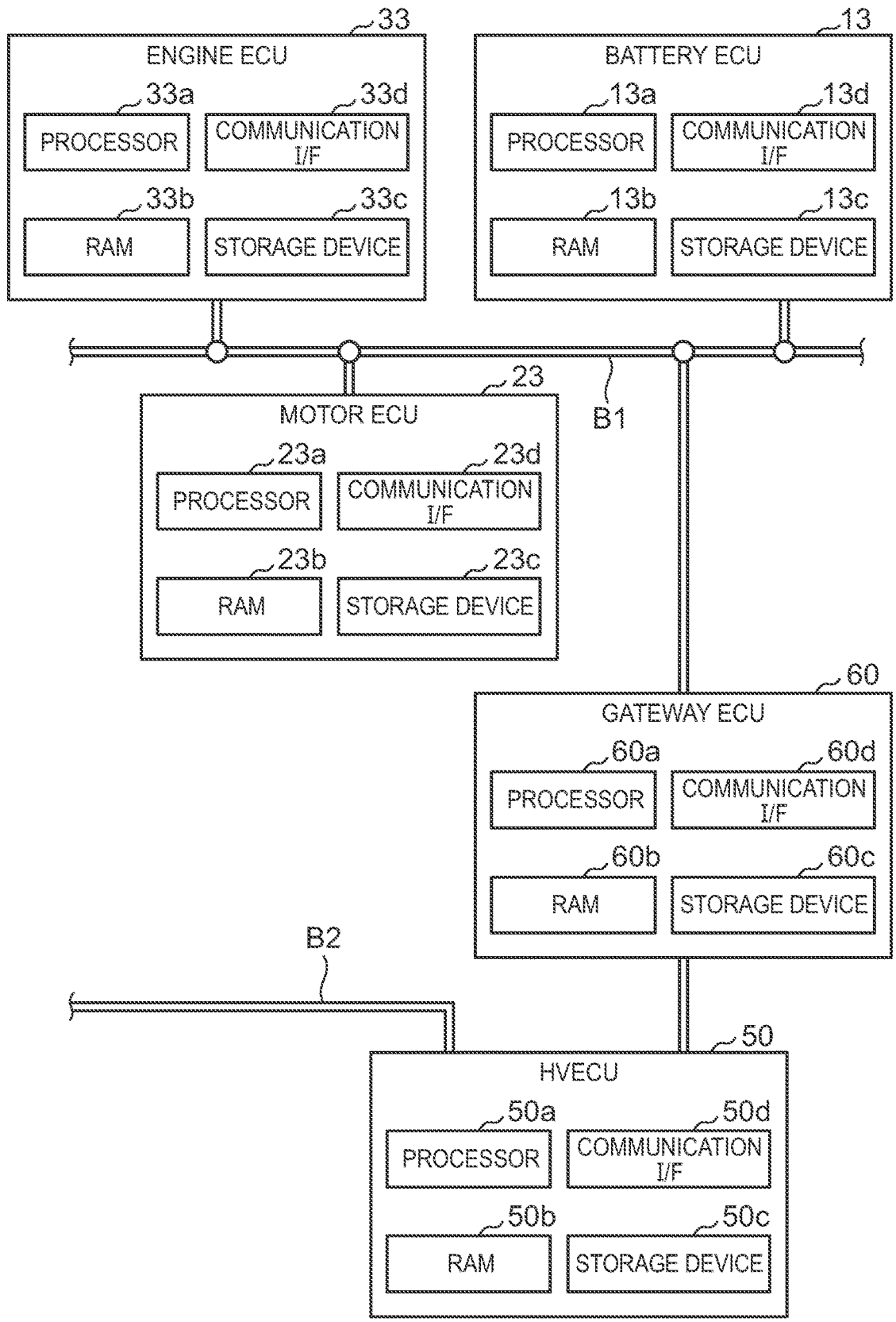
FIG. 2 is a diagram showing a connection mode of each control device included in the vehicle according to the embodiment of the present disclosure.

FIG. 2 is a diagram showing a connection mode of each control device included in the vehicle 100 according to the present embodiment. Referring to FIG. 1 and FIG. 2, the vehicle 100 is equipped with an in-vehicle local area network (LAN) including a local bus B1 and a global bus B2. Each control device (for example, the battery ECU 13, the motor ECU 23, and the engine ECU 33) mounted on the vehicle 100 is connected to the in-vehicle LAN. In this embodiment, a controller area network (CAN) is adopted as the communication protocol of the in-vehicle LAN. Each of the local bus B1 and the global bus B2 is, for example, a CAN bus. However, the communication protocol of the in-vehicle LAN is not limited to the CAN. The communication protocol of the in-vehicle LAN may be of any type, and may be FlexRay, for example.

The battery ECU 13, the motor ECU 23, and the engine ECU 33 are connected to the local bus B1. Although not shown, a plurality of control devices is connected to the global bus B2. The control devices connected to the global bus B2 include, for example, a human machine interface (HMI) control device. Examples of the HMI control device include a control device that controls a navigation system or a meter panel. The global bus B2 is connected to another global bus via a central gateway (CGW) not shown.

The HV ECU 50 is connected to the global bus B2. The HV ECU 50 is configured to perform CAN communication with each control device connected to the global bus B2. The HV ECU 50 is connected to the local bus B1 via the gateway ECU 60. The gateway ECU 60 is configured to relay communication between the HV ECU 50 and each control device (for example, the battery ECU 13, the motor ECU 23, and the engine ECU 33) that is connected to the local bus B1. The HV ECU 50 is configured to mutually perform CAN communication with each control device connected to the local bus B1 via the gateway ECU 60. The gateway ECU 60 may be configured to collect and save data regarding the vehicle 100 (for example, various pieces of information acquired by the in-vehicle sensors, and IWin, IWout, Win, Wout and control commands $S_{M1}$, $S_{M2}$, $S_E$ described later). Further, the gateway ECU 60 may have a firewall function. The gateway ECU 60 may be configured to detect unauthorized communication in cooperation with at least one of the firewall function and an error detection function of the CAN communication.

In the present embodiment, a microcomputer is used as the battery ECU 13, the motor ECU 23, the engine ECU 33, the HV ECU 50, and the gateway ECU 60. The battery ECU 13 includes a processor 13a, a random access memory (RAM) 13b, a storage device 13c, and a communication interface (I/F) 13d. The motor ECU 23 includes a processor 23a, a RAM 23b, a storage device 23c, and a communication I/F 23d. The engine ECU 33 includes a processor 33a, a RAM 33b, a storage device 33c, and a communication I/F 33d. The HV ECU 50 includes a processor 50a, a RAM 50b, a storage device 50c, and a communication I/F 50d. The gateway ECU 60 includes a processor 60a, a RAM 60b, a storage device 60c, and a communication I/F 60d. A central processing unit (CPU), for example, can be used as the processors. Each communication I/F includes a CAN controller. Each RAM functions as a working memory that temporarily stores data processed by the processor. Each storage device is configured to be able to save stored information. Each storage device includes, for example, a read-only memory (ROM) and a rewritable nonvolatile memory. Each storage device stores, in addition to a program, information that is used in the program (for example, a map, a mathematical expression, and various parameters). Various controls of the vehicle 100 are executed when the processors execute the programs stored in the storage devices. However, the present disclosure is not limited to this, and various controls may be executed by dedicated hardware (electronic circuit). The number of processors included in each ECU is not limited, and any ECU may include a plurality of processors.

Charge/discharge control of the battery 11 will be described referring to FIG. 1 again. Hereinafter, the input power of the battery 11 and the output power of the battery 11 are collectively referred to as "battery power". The HV ECU 50 determines target battery power using the SOC of the battery 11. Then, the HV ECU 50 controls charge/discharge of the battery 11 so that the battery power becomes closer to the target battery power. However, such charge/discharge control of the battery 11 is restricted by input/output restriction described later. Hereinafter, the target battery power on the charging side (input side) may be referred to as "target input power", and the target battery power on the discharging side (output side) may be referred to as "target output power". In the present embodiment, the power on the discharging side is represented by a positive (+) value and the power on the charging side is represented by a negative (−) value. However, when comparing the magnitude of the power, the absolute value is used regardless of the positive or negative sign (+/−). That is, the magnitude of the power is smaller as the value becomes closer to zero. When an upper limit value and a lower limit value are set for the power, the upper limit value is located on the side where the absolute value of the power is large, and the lower limit value is located on the side where the absolute value of the power is small. The power exceeding the upper limit value on the positive side means that the power becomes larger on the positive side than the upper limit value (that is, the power moves away to the positive side with respect to zero). The power exceeding the upper limit value on the negative side means that the power becomes larger on the negative side than the upper limit value (that is, the power moves away to the negative side with respect to zero). The SOC indicates the remaining charge amount and, for example, the ratio of the current charge amount to the charge amount in the fully charged state is represented by a range between 0% and 100%. As the measuring method of the SOC, a known method such as a current integration method or an open circuit voltage (OCV) estimation method can be adopted.

Figure 3:
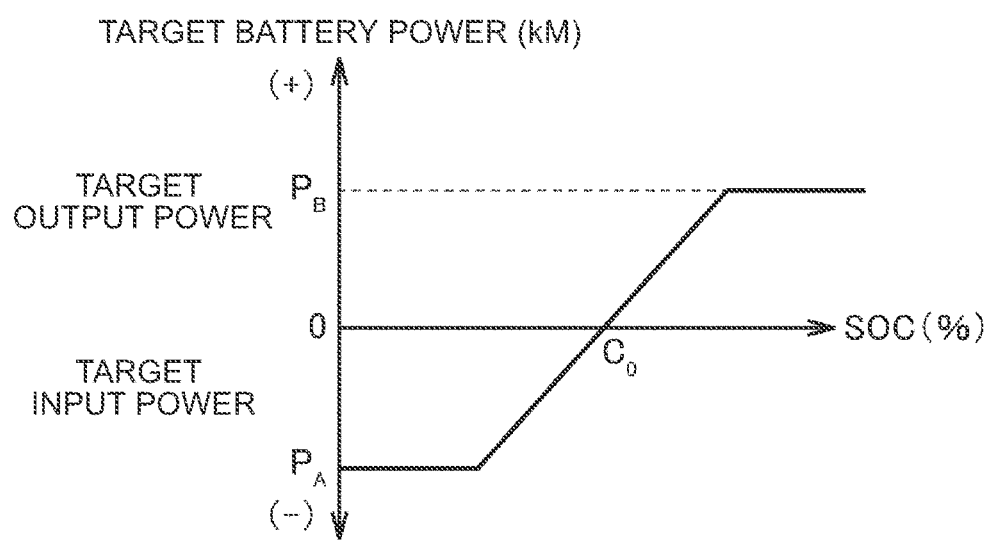
FIG. 3 is a diagram showing an example of a map used to set a target battery power in the vehicle according to the embodiment of the present disclosure.

FIG. 3 is a diagram showing an example of a map used for determining the target battery power. In FIG. 3, a reference value $C_0$ indicates a control center value of the SOC, a power value $P_A$ indicates a maximum value of the target input power, and a power value $P_B$ indicates a maximum value of the target output power. Referring to FIG. 3 together with FIG. 1, according to this map, when the SOC of the battery 11 is the reference value $C_0$, the target battery power is "0", and the battery 11 is neither charged nor discharged. In the region where the SOC of the battery 11 is smaller than the reference value $C_0$ (excessive discharge region), the target input power is larger as the SOC of the battery 11 is smaller until the target input power reaches the maximum value (power value $P_A$). In contrast, in a region where the SOC of the battery 11 is larger than the reference value $C_0$ (overcharge region), the target output power is larger as the SOC of the battery 11 is larger until the target output power reaches the maximum value (power value $P_B$). The HV ECU 50 determines the target battery power in accordance with the map shown in FIG. 3, and charges and discharges the battery 11 so that the battery power becomes closer to the determined target battery power, thereby bringing the SOC of the battery 11 closer to the reference value $C_0$. The reference value $C_0$ of the SOC may be a fixed value or may be variable depending on the situation of the vehicle 100.

The HV ECU 50 is configured to perform input restriction and output restriction of the battery 11. The HV ECU 50 sets a first power upper limit value (hereinafter, referred to as "Win") indicating an upper limit value of the input power of the battery 11 and a second power upper limit value (hereinafter, referred to as "Wout") indicating an upper limit value of the output power of the battery 11, and controls battery power such that the battery power does not exceed the set Win and Wout. The HV ECU 50 adjusts the battery power by controlling the engine 31 and the PCU 24. When Win or Wout is smaller (that is, closer to zero) than the target battery power, the battery power is controlled to Win or Wout instead of the target battery power. In the present embodiment, Win can be regarded as an example of the "first power upper limit value" and Wout can be regarded as an example of the "second power upper limit value" according to the present disclosure.

The battery ECU 13 is configured to use a detection value of the battery sensor 12 to obtain a first current upper limit value (hereinafter, also referred to as "IWin") indicating an upper limit value of the input current of the battery 11. The battery ECU 13 is also configured to use a detection value of the battery sensor 12 to obtain a second current upper limit value (hereinafter, also referred to as "IWout") indicating an upper limit value of the output current of the battery 11. That is, the battery pack 10 corresponds to a current restricting battery pack. On the other hand, the HV ECU 50 is configured to use Win to control the input power of the battery 11. The HV ECU 50 is configured to perform power-based input restriction (that is, a process of controlling the input power of the battery 11 so that the input power of the battery 11 does not exceed Win). Further, the HV ECU 50 is configured to use Wout to control the output power of the battery 11. The HV ECU 50 is configured to perform power-based output restriction (that is, a process of controlling the output power of the battery 11 so that the output power of the battery 11 does not exceed Wout). That is, the HV ECU 50 corresponds to a power restricting control device. In the present embodiment, IWin can be regarded as an example of the "first current upper limit value" and IWout can be regarded as an example of the "second current upper limit value" according to the present disclosure.

As described above, the vehicle 100 includes the current restricting battery pack (that is, the battery pack 10) and the power restricting control device (that is, the HV ECU 50). In the vehicle 100, the current restricting battery pack and the power restricting control device are used in combination. IWin and IWout are output from the battery pack 10, and IWin and IWout are respectively converted into Win and Wout by the gateway ECU 60 interposed between the battery pack 10 and the HV ECU 50. Thereby, Win and Wout are input to the HV ECU 50. With this configuration, the HV ECU 50 can appropriately perform power-based input restriction and power-based output restriction on the battery 11 included in the battery pack 10.

Figure 4:
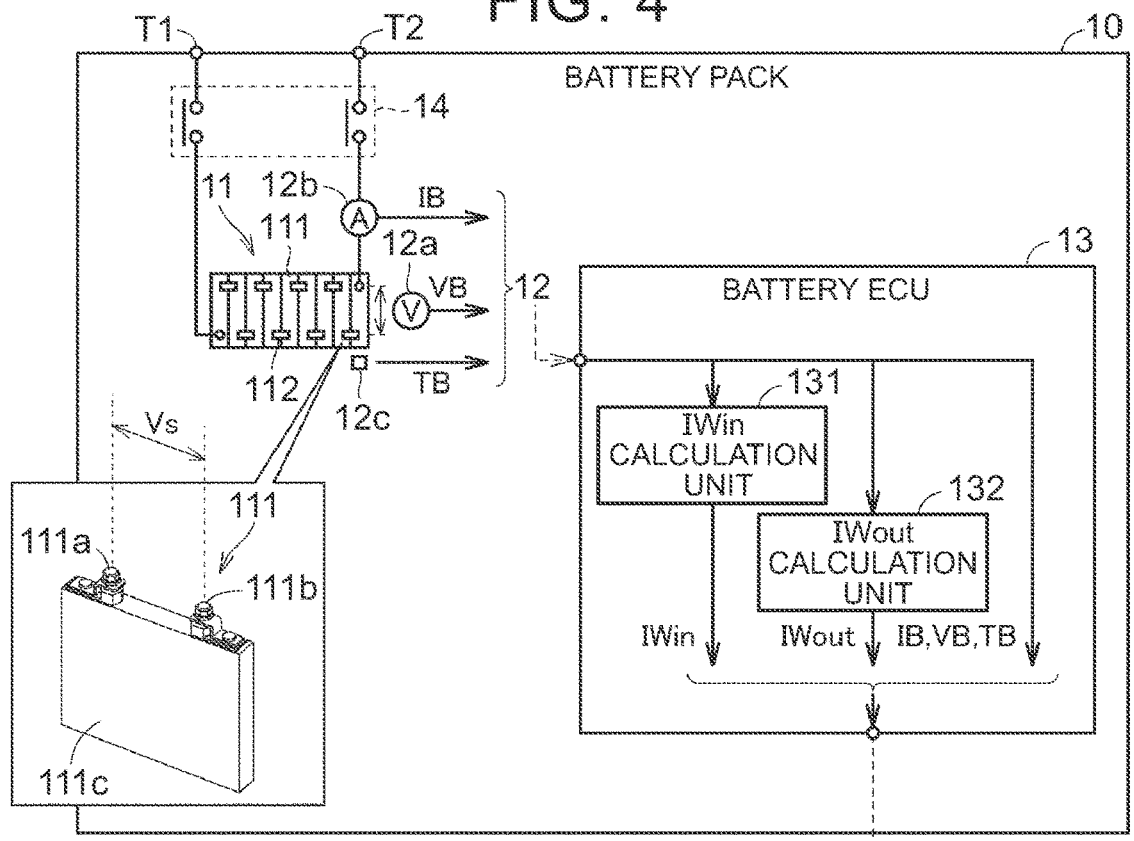
FIG. 4 is a diagram showing a detailed configuration of a battery pack, a gateway electronic control unit (ECU), and a hybrid vehicle (HV) ECU shown in FIG. 1.
Figure 4:
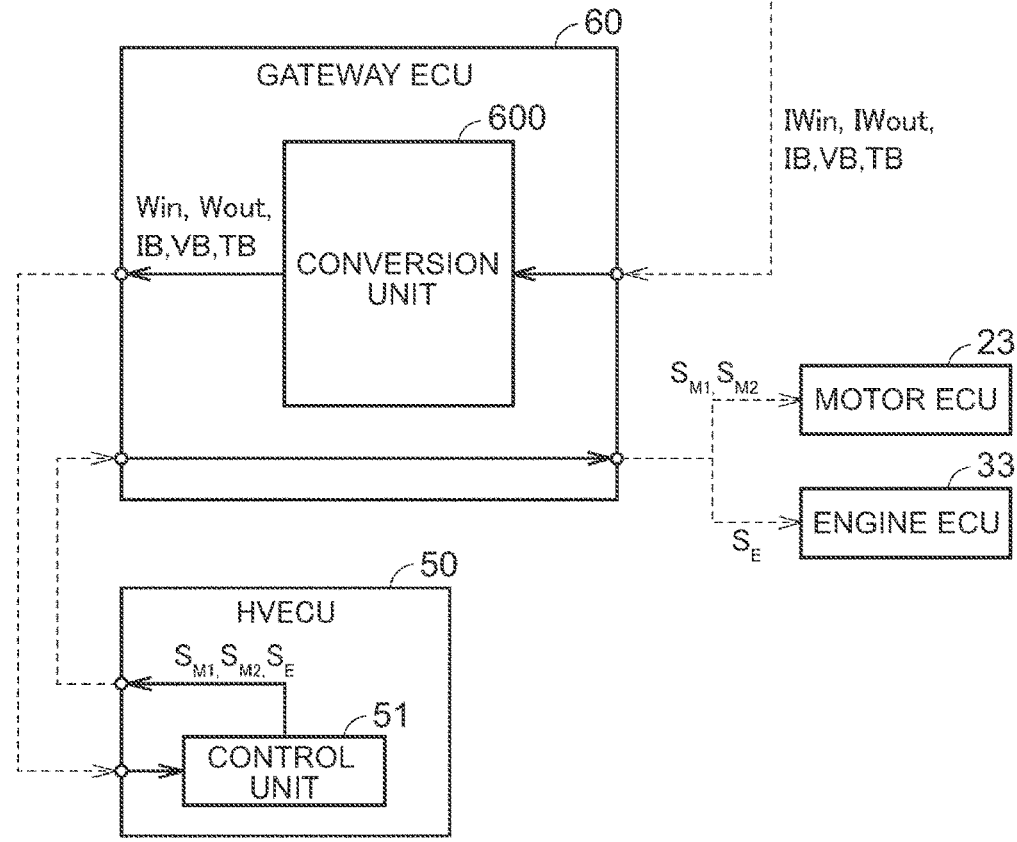

FIG. 4 is a diagram showing a detailed configuration of the battery pack 10, the gateway ECU 60, and the HV ECU 50. Referring to FIG. 4 together with FIG. 2, in the present embodiment, the battery 11 included in the battery pack 10 is an assembled battery including a plurality of cells 111. Each cell 111 is, for example, a lithium ion battery. Each cell 111 includes a positive electrode terminal 111a, a negative electrode terminal 111b, and a battery case 111c. The voltage between the positive electrode terminal 111a and the negative electrode terminal 111b corresponds to a cell voltage Vs. In the battery 11, the positive electrode terminal 111a of one cell 111 and the negative electrode terminal 111b of another cell 111 adjacent to the one cell 111 are electrically connected to each other by a bus bar 112 having conductivity. The cells 111 are connected to each other in series. However, the present disclosure is not limited to this, and any connection mode may be adopted in the assembled battery.

The battery pack 10 includes the battery sensor 12, the battery ECU 13, and the SMR 14 in addition to the battery 11. Signals output from the battery sensor 12 to the battery ECU 13 (hereinafter, also referred to as "battery sensor signals") include a voltage signal VB output from the voltage sensor 12a, a current signal IB output from the current sensor 12b, and a temperature signal TB output from the temperature sensor 12c. The voltage signal VB indicates a measured value of the voltage of each cell 111 (cell voltage $V_S$). The current signal IB indicates a measured value of the current flowing through the battery 11 (the charging side takes a negative value). The temperature signal TB indicates a measured value of the temperature of each cell 111.

The battery ECU 13 repeatedly obtains the latest battery sensor signals. The interval at which the battery ECU 13 acquires the battery sensor signals (hereinafter also referred to as "sampling cycle") may be a fixed value or may be variable. In the present embodiment, the sampling cycle is 8 ms. However, the present disclosure is not limited to this, and the sampling cycle may be variable within a predetermined range (for example, a range from 1 msec to 1 sec). Hereinafter, the number of times the battery ECU 13 acquires the battery sensor signals per unit time may be referred to as "sampling rate". There is a tendency that the higher the sampling rate is, the higher the accuracy of obtaining Win and Wout (that is, conversion accuracy) through the conversion process described later is.

The battery ECU 13 includes an IWin calculation unit 131 and an IWout calculation unit 132. The IWin calculation unit 131 is configured to use the detection value of the battery sensor 12 (that is, the battery sensor signals) to obtain IWin. A known method can be used as the calculation method of IWin. The IWin calculation unit 131 may determine IWin so that charge current restriction is performed to protect the battery 11. IWin may be determined to suppress overcharge, Li deposition, high rate deterioration, and battery overheating in the battery 11, for example. The IWout calculation unit 132 is configured to use the detection value of the battery sensor 12 (that is, the battery sensor signals) to obtain IWout. A known method can be used as the calculation method of IWout. The IWout calculation unit 132 may determine IWout so that discharge current restriction is performed to protect the battery 11. IWout may be determined to suppress overdischarge, Li deposition, high rate deterioration, and battery overheating in the battery 11, for example. In the battery ECU 13, for example, the IWin calculation unit 131 and the IWout calculation unit 132 are implemented by the processor 13a shown in FIG. 2 and the program executed by the processor 13a. However, the present disclosure is not limited to this, and the IWin calculation unit 131 and the IWout calculation unit 132 may be implemented by dedicated hardware (electronic circuit).

The battery pack 10 outputs IWin calculated by the IWin calculation unit 131, IWout calculated by the IWout calculation unit 132, and the signals acquired from the battery sensor 12 (that is, the battery sensor signals) to the gateway ECU 60. These pieces of information are output from the battery ECU 13 included in the battery pack 10 to the gateway ECU 60 provided outside the battery pack 10. As shown in FIG. 2, the battery ECU 13 and the gateway ECU 60 exchange information through CAN communication.

Figure 5:
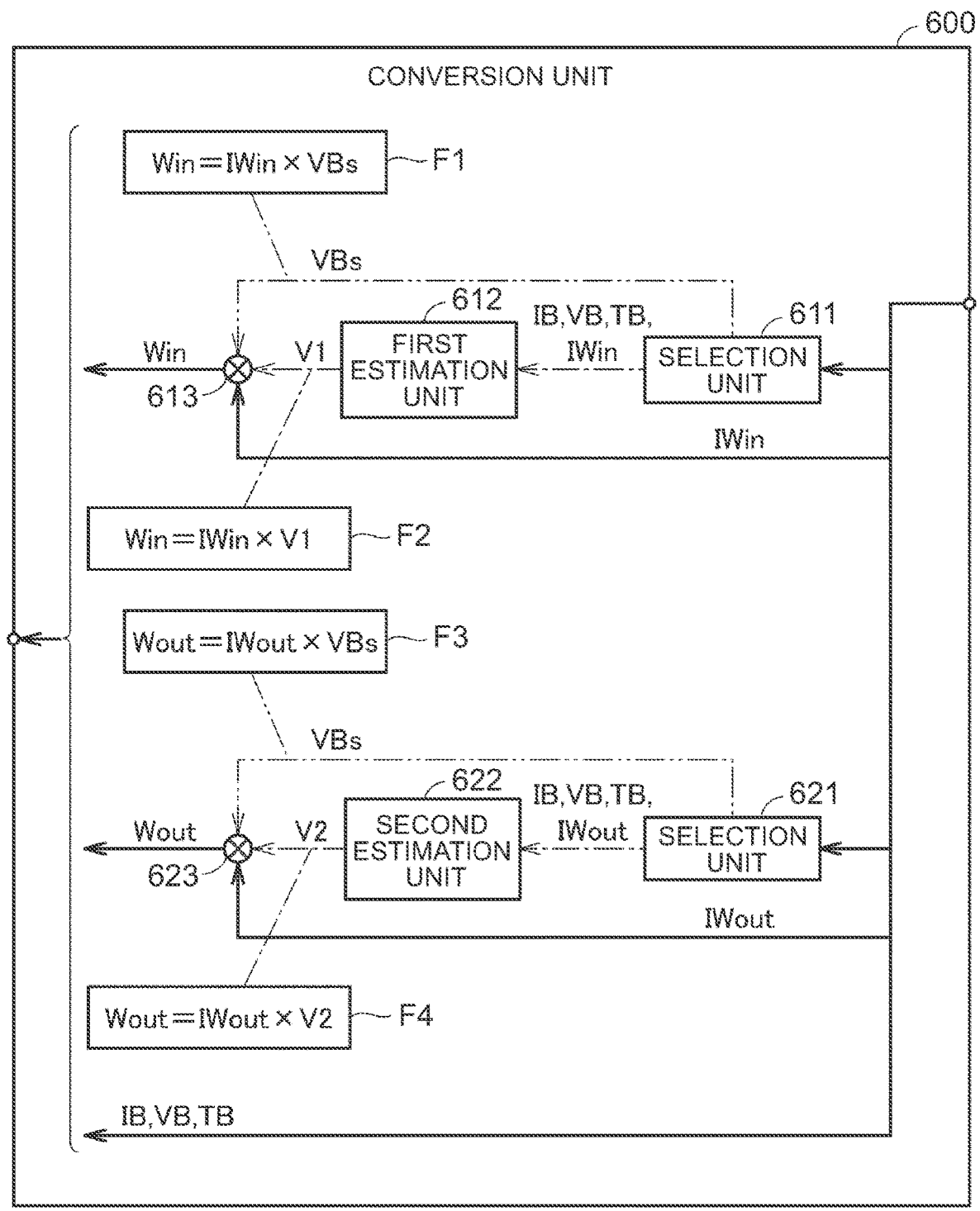
FIG. 5 is a diagram showing a detailed configuration of a conversion unit shown in FIG. 4.

The gateway ECU 60 includes a conversion unit 600 described below. FIG. 5 is a diagram showing a detailed configuration of the conversion unit 600. Referring to FIG. 5 together with FIG. 4, the conversion unit 600 includes selection units 611 and 621, a first estimation unit 612, a second estimation unit 622, and calculation units 613 and 623. In the gateway ECU 60, for example, the conversion unit 600 (and therefore the selection units 611 and 621, the first estimation unit 612, the second estimation unit 622, and the calculation units 613 and 623) is implemented by the processor 60a shown in FIG. 2 and the program executed by the processor 60a. However, the present disclosure is not limited to this, and the conversion unit 600 may be implemented by dedicated hardware (electronic circuit). The conversion unit 600 according to the present embodiment can be regarded as an example of the "converter" according to the present disclosure.

The selection unit 611 is configured to select a conversion formula (more specifically, a conversion formula used for conversion from IWin into Win) from the options according to the situation. In the present embodiment, the above options include the conversion formulas F1 and F2 shown below. When the state of the battery 11 is not included in a predetermined first state, the selection unit 611 selects the conversion formula F1. When the state of the battery 11 is included in the first state, the selection unit 611 selects the conversion formula F2. The first state can be set as desired by a user. Details of the first state according to the present embodiment will be described later. Each of the conversion formulas F1 and F2 is stored in the storage device 60c (FIG. 2) in advance. The conversion formulas F1 and F2 according to the present embodiment can be regarded as examples of the "first conversion formula" and the "second conversion formula" according to the present disclosure, respectively.

$$Win = IWin \times VBs \quad (F1)$$

$$Win = IWin \times V1 \quad (F2)$$

The conversion formula F1 converts IWin into Win by multiplying IWin by VBs. In the conversion formula F1, VBs represents a measured value of the voltage of the battery 11 that is detected by the battery sensor 12. In the present embodiment, the average cell voltage (for example, the average value of the voltages of all the cells 111 constituting the battery 11) is adopted as VBs. However, the present disclosure is not limited to this. Instead of the average cell voltage, the maximum cell voltage (that is, the highest voltage value among the voltages of the cells 111), the minimum cell voltage (that is, the lowest voltage value among the voltages of the cells 111), or the inter-terminal voltage of the assembled battery (that is, the voltage applied between the external connection terminals T1 and T2 when the SMR 14 is in the closed state) may be adopted as VBs.

The conversion formula F2 converts IWin into Win by multiplying IWin by V1. In the conversion formula F2, V1 represents a voltage value of the battery 11 in a state where a current corresponding to IWin is flowing through the battery 11. V1 is estimated by the first estimation unit 612. The method of estimating V1 will be described later. V1 according to the present embodiment can be regarded as an example of the "first estimated voltage value" according to the present disclosure.

The selection unit 621 is configured to select a conversion formula (more specifically, a conversion formula used for conversion from IWout to Wout) from the options according to the situation. In the present embodiment, the above options include conversion formulas F3 and F4 shown below. When the state of the battery 11 is not included in a predetermined second state, the selection unit 621 selects the conversion formula F3, and when the state of the battery 11 is included in the second state, the selection unit 621 selects the conversion formula F4. The second state can be set as desired by the user. Details of the second state according to the present embodiment will be described later. Each of the conversion formulas F3 and F4 is stored in the storage device 60c (FIG. 2) in advance. The conversion formulas F3 and F4 according to the present embodiment can be regarded as examples of the "third conversion formula" and the "fourth conversion formula" according to the present disclosure, respectively.

$$Wout = IWout \times VBs \quad (F3)$$

$$Wout = IWout \times V2 \quad (F4)$$

VBs in the conversion formula F3 is the same as VBs in the conversion formula F1. In the conversion formula F4, V2 represents a voltage value of the battery 11 in a state where a current corresponding to IWout is flowing through the battery 11. V2 is estimated by the second estimation unit 622. The method of estimating V2 will be described later. V2 according to the present embodiment can be regarded as an example of the "second estimated voltage value" according to the present disclosure.

The calculation unit 613 converts IWin into Win using the conversion formula selected by the selection unit 611 (either of the conversion formulas F1 and F2 in the present embodiment). When the state of the battery 11 is not included in the first state, the calculation unit 613 converts IWin into Win using the conversion formula F1. The calculation unit 623 converts IWout into Wout using the conversion formula selected by the selection unit 621 (either of the conversion formulas F3 and F4 in the present embodiment). When the state of the battery 11 is not included in the second state, the calculation unit 623 converts IWout into Wout using the conversion formula F3.

Figure 6:
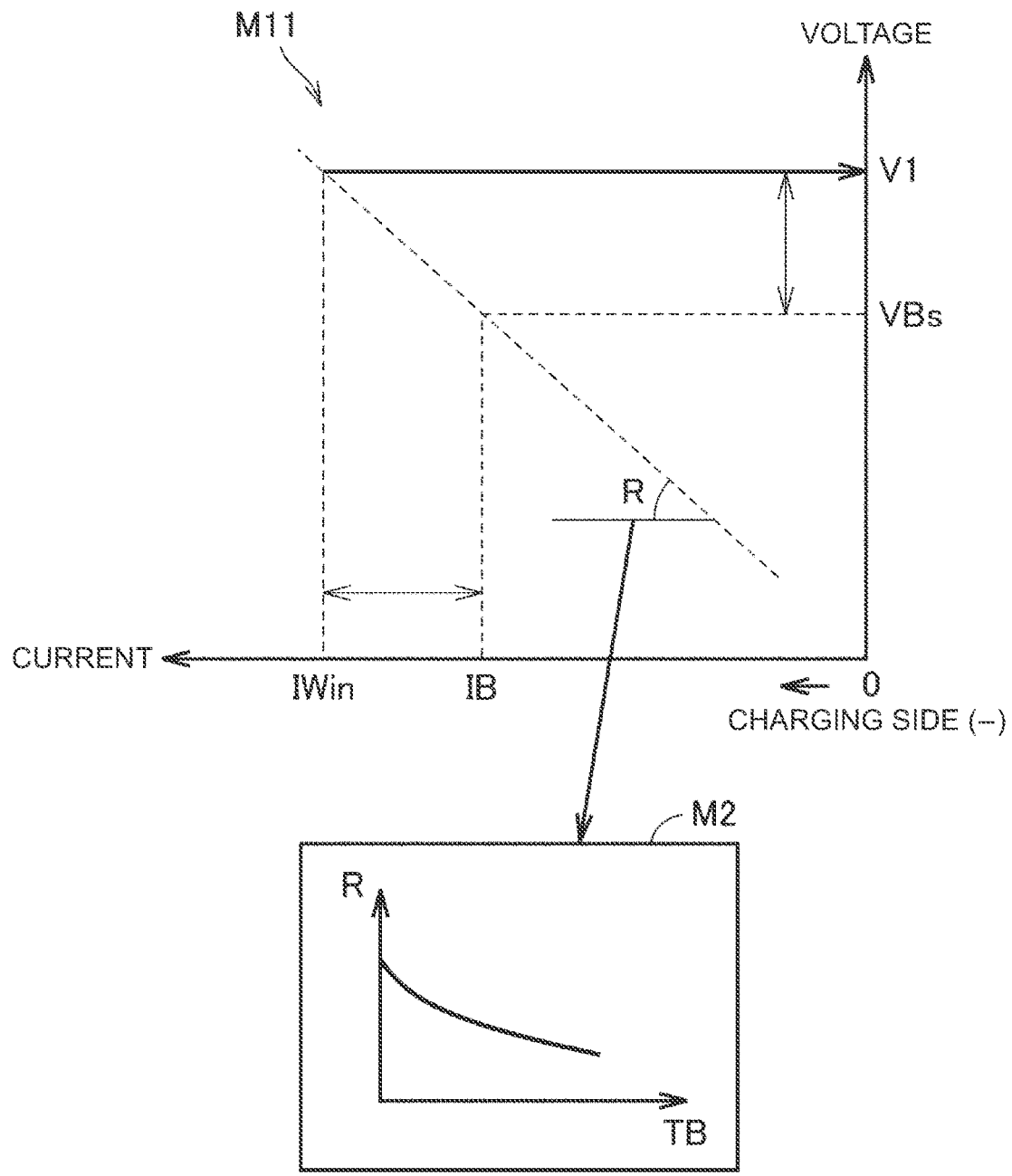
FIG. 6 is a diagram for describing a method of obtaining a first estimated voltage value according to the embodiment of the present disclosure.

When the state of the battery 11 is included in the first state, the selection unit 611 selects the conversion formula F2, and the calculation unit 613 uses the conversion formula F2 to convert IWin to Win. At this time, the first estimation unit 612 estimates V1 in the conversion formula F2 and outputs the estimated V1 to the calculation unit 613. FIG. 6 is a diagram for describing the method of estimating V1 with the first estimation unit 612.

Hereinafter, the measured value of the current and the measured value of the voltage of the battery 11 (secondary battery) that are detected by the battery sensor 12 may be referred to as "actual current" and "actual voltage", respectively. Referring to FIG. 6 together with FIG. 5, the first estimation unit 612 uses the actual current and the actual voltage of the battery 11 (that is, the measured values of the current and the voltage of the battery 11 detected by the battery sensor 12), the internal resistance of the battery 11, and IWin to obtain V1. A graph M11 in FIG. 6 shows the following relational expression.

$$V1 = VBs - (IWin - IB) \times R$$

In the above relational expression, "R" indicates the internal resistance, "IB" indicates the actual current, and "VBs" indicates the actual voltage. VBs in the above relational expression is the same as VBs in the conversion formula F1. The above relational expression is stored in the storage device 60c (FIG. 2) in advance. The above relational expression may include a predetermined correction term (for example, a correction term regarding polarization).

In the present embodiment, the first estimation unit 612 refers to a map M2 to obtain the internal resistance of the battery 11. In the map M2, "R" indicates the internal resistance and "TB" indicates the temperature of the battery 11. The map M2 is information indicating the relationship between the temperature (TB) of the battery 11 and the internal resistance (R) of the battery 11, and is stored in the storage device 60c (FIG. 2) in advance. The first estimation unit 612 can obtain the internal resistance of the battery 11 from the temperature of the battery 11. The temperature of the battery 11 used to obtain the internal resistance is, for example, a measured value of the temperature of the battery 11 detected by the temperature sensor 12c. For example, any one of an average cell temperature, a maximum cell temperature, and a minimum cell temperature may be adopted as the temperature of the battery 11. As shown in the map M2, the internal resistance of the battery 11 tends to decrease as the temperature of the battery 11 increases.

Referring again to FIG. 5, when the state of the battery 11 is included in the first state, the selection unit 611 selects the conversion formula F2, and the first estimation unit 612 estimates V1 as described above. Then, the calculation unit 613 receives V1 from the first estimation unit 612 and multiplies IWin input from the battery pack 10 (FIG. 4) by V1. As described above, when the state of the battery 11 is included in the first state, the calculation unit 613 converts IWin into Win according to the conversion formula F2. In contrast, when the state of the battery 11 is not included in the first state, the selection unit 611 selects the conversion formula F1 and the calculation unit 613 uses the conversion formula F1 to convert IWin into Win. The calculation unit 613 can obtain VBs in the conversion formula F1 by using the battery sensor signal (particularly, the voltage signal VB).

The conversion formula F2 uses V1 estimated from the actual voltage and the actual current to convert IWin into Win. It is considered in the conversion formula F2 that the voltage of the battery 11 changes depending on the magnitude of the current, and Win corresponding to IWin can be obtained with higher accuracy in the conversion using the conversion formula F2 than in the conversion using the conversion formula F1. On the other hand, since the actual voltage is used as it is in the conversion formula F1, IWin can be converted into Win without performing a complicated calculation. Therefore, the calculation load on the calculation unit 613 is smaller in the conversion using the conversion formula F1 than in the conversion using the conversion formula F2.

Figure 7:
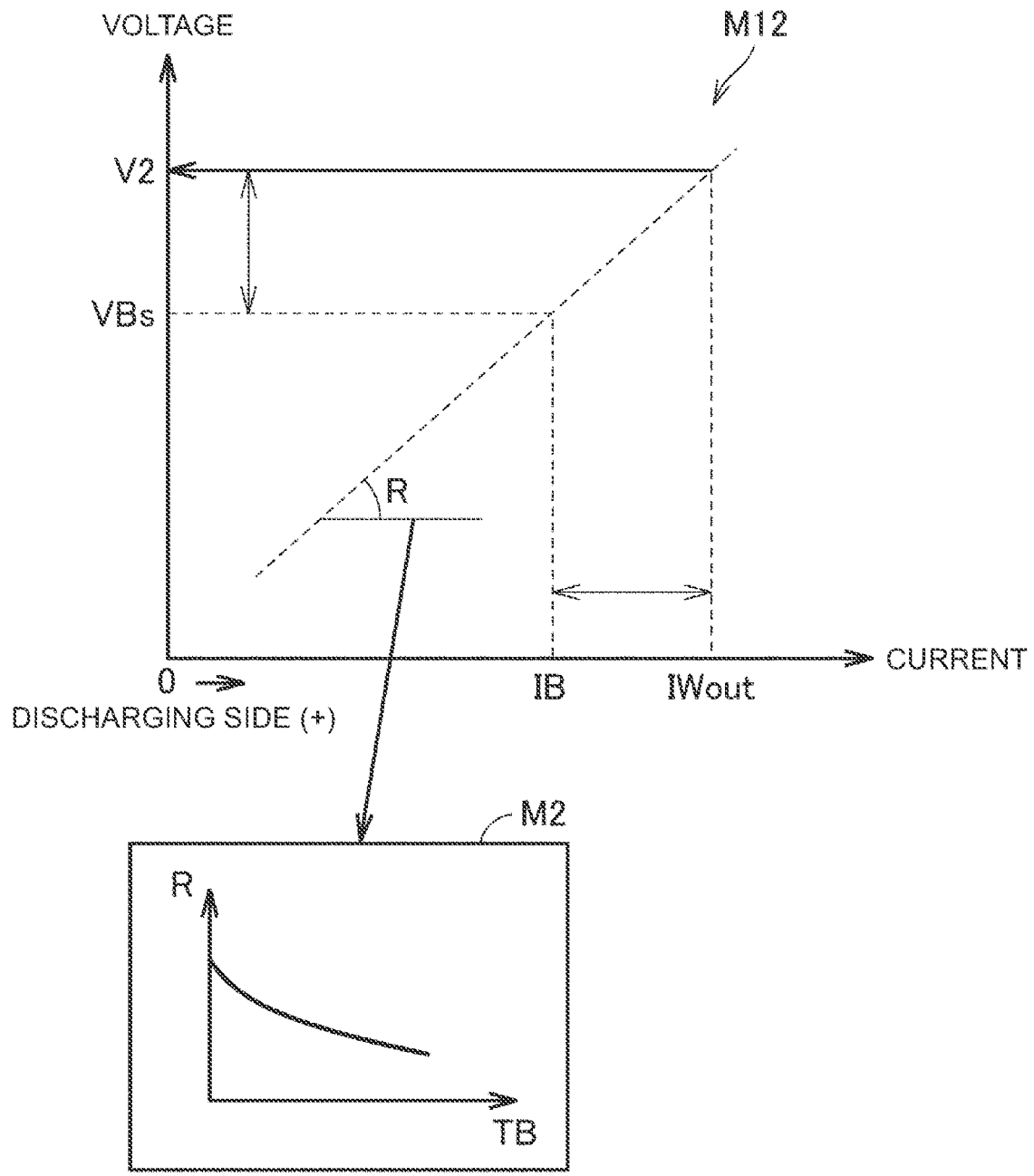
FIG. 7 is a diagram for describing a method of obtaining a second estimated voltage value according to the embodiment of the present disclosure.

When the state of the battery 11 is included in the second state, the selection unit 621 selects the conversion formula F4, and the calculation unit 623 uses the conversion formula F4 to convert IWout into Wout. At this time, the second estimation unit 622 estimates V2 in the conversion formula F4 and outputs the estimated V2 to the calculation unit 623. FIG. 7 is a diagram for describing the method of estimating V2 with the second estimation unit 622.

Referring to FIG. 7 together with FIG. 5, the second estimation unit 622 uses the actual current and the actual voltage of the battery 11 (that is, the measured values of the current and the voltage of the battery 11 detected by the battery sensor 12), the internal resistance of the battery 11, and IWout to obtain V2. A graph M12 in FIG. 7 shows the following relational expression.

$$V2 = VBs + (IWout - IB) \times R$$

In the above relational expression, "R" indicates the internal resistance, "IB" indicates the actual current, and "VBs" indicates the actual voltage. VBs in the above relational expression is the same as VBs in the conversion formula F1. The above relational expression is stored in the storage device 60c (FIG. 2) in advance. The above relational expression may include a predetermined correction term (for example, a correction term regarding polarization).

In the present embodiment, the second estimation unit 622 refers to the map M2 to obtain the internal resistance of the battery 11. The map M2 shown in FIG. 7 is the same as the map M2 shown in FIG. 6. Each of the first estimation unit 612 and the second estimation unit 622 may periodically detect the actual current and the actual voltage, and correct the map M2 based on the relationship between the actual current and the actual voltage. The storage device 60c may store the internal resistance as a fixed value instead of the map M2.

Referring again to FIG. 5, when the state of the battery 11 is included in the second state, the selection unit 621 selects the conversion formula F4, and the second estimation unit 622 estimates V2 as described above. Then, the calculation unit 623 receives V2 from the second estimation unit 622 and multiplies IWout input from the battery pack 10 (FIG. 4) by V2. As described above, when the state of the battery 11 is included in the second state, the calculation unit 623 converts IWout into Wout according to the conversion formula F4. In contrast, when the state of the battery 11 is not included in the second state, the selection unit 621 selects the conversion formula F3, and the calculation unit 623 uses the conversion formula F3 to convert IWout into Wout. The calculation unit 623 can obtain VBs in the conversion formula F3 by using the battery sensor signal (particularly, the voltage signal VB).

The conversion formula F4 uses V2 estimated from the actual voltage and the actual current to convert IWout into Wout. It is considered in the conversion formula F4 that the voltage of the battery 11 changes depending on the magnitude of the current, and Wout corresponding to IWout can be obtained with higher accuracy in the conversion using the conversion formula F4 than in the conversion using the conversion formula F3. On the other hand, since the actual voltage is used as it is in the conversion formula F3, IWout can be converted into Wout without performing a complicated calculation. Therefore, the calculation load on the calculation unit 623 is smaller in the conversion using the conversion formula F3 than in the conversion using the conversion formula F4.

Referring again to FIG. 4, when IWin, IWout, and the battery sensor signals are input from the battery pack 10 to the gateway ECU 60, the conversion unit 600 of the gateway ECU 60 (see FIG. 5 for the detailed configuration) converts IWin and IWout into Win and Wout, respectively. The conversion from IWin into Win is performed by using the conversion formula F2 when the state of the battery 11 is included in the first state, and by using the conversion formula F1 when the state of the battery 11 is not included in the first state. The conversion from IWout into Wout is performed by using the conversion formula F4 when the state of the battery 11 is included in the second state, and by using the conversion formula F3 when the state of the battery 11 is not included in the second state.

The gateway ECU 60 outputs Win and Wout obtained by the above conversion and the battery sensor signals obtained from the battery pack 10 to the HV ECU 50. The gateway ECU 60 sequentially acquires IWin, IWout, and VBs from the battery pack 10 in real time, calculates Win and Wout, and transmits Win and Wout to the HV ECU 50. Win and Wout transmitted from the gateway ECU 60 to the HV ECU 50 are sequentially updated using the latest IWin, IWout, VBs (that is, real-time values). As shown in FIG. 2, the gateway ECU 60 and the HV ECU 50 exchange information through CAN communication.

The HV ECU 50 includes a control unit 51 described below. In the HV ECU 50, for example, the control unit 51 is implemented by the processor 50a shown in FIG. 2 and the program executed by the processor 50a. However, the present disclosure is not limited to this, and the control unit 51 may be implemented by dedicated hardware (electronic circuit).

The control unit 51 is configured to use Win to control the input power of the battery 11. Further, the control unit 51 is configured to use Wout to control the output power of the battery 11. In the present embodiment, the control unit 51 creates the control commands $S_{M1}$, $S_{M2}$, and $S_E$ for the MG 21a, MG 21b, and the engine 31 shown in FIG. 1, respectively, so that the input power and the output power of the battery 11 do not exceed Win and Wout, respectively. The control unit 51 outputs the control commands $S_{M1}$ and $S_{M2}$ for the MG 21a and the MG 21b to the motor ECU 23, and outputs the control command $S_E$ for the engine 31 to the engine ECU 33. The control commands $S_{M1}$ and $S_{M2}$ output from the HV ECU 50 are sent to the motor ECU 23 through the gateway ECU 60. The motor ECU 23 controls the PCU 24 (FIG. 1) according to the received control commands $S_{M1}$ and $S_{M2}$. The control command $S_E$ output from the HV ECU 50 is sent to the engine ECU 33 through the gateway ECU 60. The engine ECU 33 controls the engine 31 according to the received control command $S_E$. The MG 21a, the MG 21b, and the engine 31 are controlled according to the control commands $S_{M1}$, $S_{M2}$, and $S_E$, so that the input power and the output power of the battery 11 are controlled so as not to exceed Win and Wout, respectively. The HV ECU 50 can adjust the input power and the output power of the battery 11 by controlling the engine 31 and the PCU 24. The HV ECU 50 sequentially acquires Win and Wout from the gateway ECU 60 in real time, creates the control commands $S_{M1}$, $S_{M2}$, and $S_E$ using the latest Win and Wout (that is, real-time values), and transmits the control commands $S_{M1}$, $S_{M2}$, and $S_E$ to the motor ECU 23 and the engine ECU 33.

Figure 8:
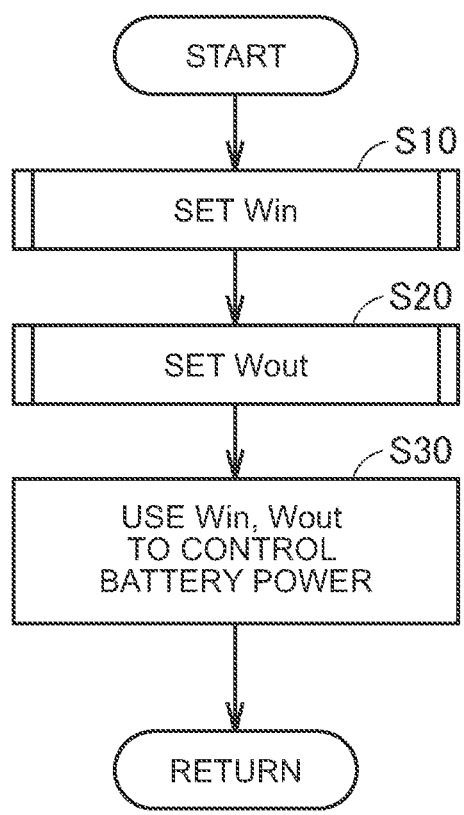
FIG. 8 is a flowchart showing a process procedure of a vehicle control method according to the embodiment of the present disclosure.

FIG. 8 is a flowchart showing a process procedure of a vehicle control method according to the present embodiment. With the process shown in this flowchart, the input power and the output power of the battery 11 are controlled. The process shown in this flowchart is repeatedly executed by being called from a main routine (not shown), for example, every time a predetermined time elapses.

Figure 9:
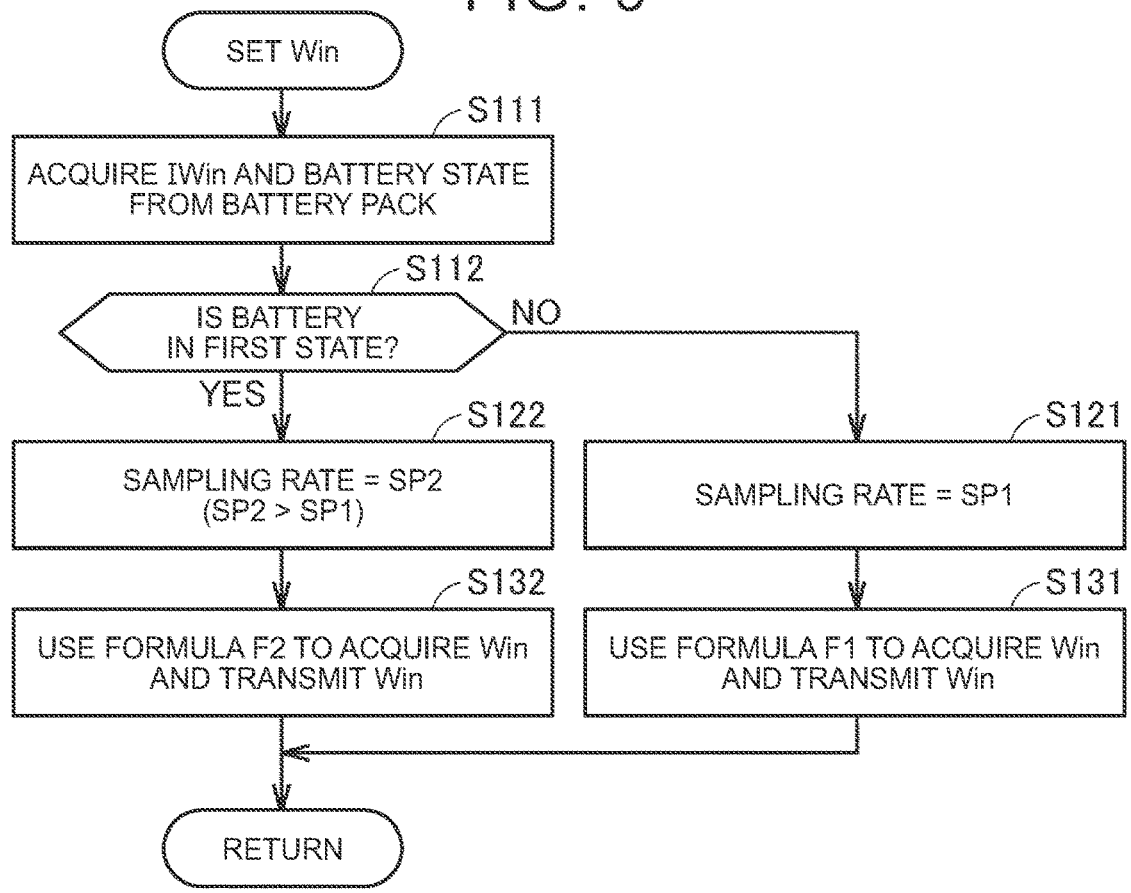
FIG. 9 is a flowchart showing details of a Win setting process shown in FIG. 8.

Referring to FIG. 8 together with FIG. 1, in step (hereinafter, simply referred to as "S") 10, the HV ECU 50 acquires Win from the gateway ECU 60 and sets Win. The set Win is stored in the storage device 50c (FIG. 2). FIG. 9 is a flowchart showing details of the process of S10 shown in FIG. 8. The gateway ECU 60 executes a series of processes shown in FIG. 9 periodically or in response to a request from the HV ECU 50.

Referring to FIG. 9 together with FIG. 1, in S111, the gateway ECU 60 acquires IWin and the detection value of the battery sensor 12 (that is, the battery sensor signals indicating the battery state) from the battery pack 10. In S112, the gateway ECU 60 determines whether the state of the battery 11 in the vehicle 100 is included in the predetermined first state. In the present embodiment, the states shown in (A-1) and (A-2) below are regarded as the first state.

(A-1) A state in which regenerative charging of the battery 11 is performed by shifting from the EV traveling to the HV traveling while the vehicle 100 is traveling at a vehicle speed equal to or higher than a predetermined speed. Hereinafter, the transition from the EV traveling to the HV traveling is also referred to as "HV transition".

(A-2) A state in which regenerative charging of the battery 11 is performed by applying the brakes of the vehicle 100 with a brake device (not shown) while the vehicle 100 is traveling at a vehicle speed equal to or higher than a predetermined speed.

Figure 10:
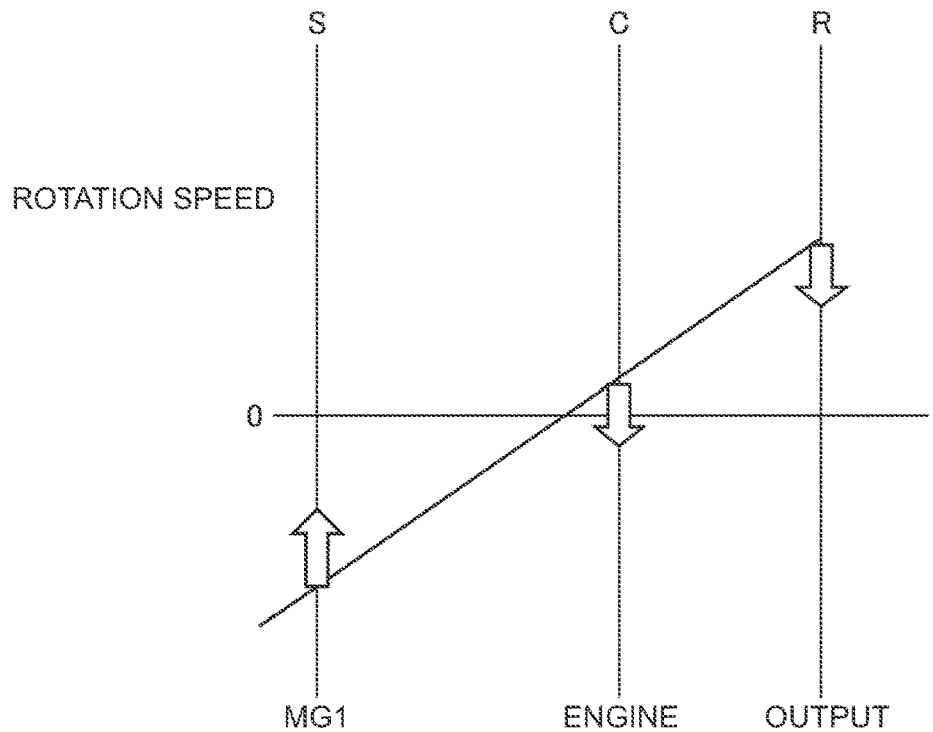
FIG. 10 is a diagram for describing a first state used in a vehicle control method according to the embodiment of the present disclosure.

Hereinafter, the battery state shown in (A-1) above will be described with reference to FIGS. 1 and 10. FIG. 10 is a collinear chart showing an example of the relationship among the rotational speeds of the sun gear S, the carrier C, and the ring gear R of the planetary gear 42 in the battery state shown in (A-1) above. Referring to FIG. 10 together with FIG. 1, in the battery state shown in (A-1) above, the carrier C (and thus the engine 31) and the ring gear R are in a positive rotation state, and the sun gear S (and thus the MG21a) is in a negative rotation state. Further, in the battery state shown in (A-1) above, a negative torque is generated in each of the engine 31 and the ring gear R due to the HV transition, and a reaction torque (that is, positive torque) acts on the MG 21a (MG1). In the battery state shown in (A-1) above, a torque in the positive rotation direction acts on the MG 21a that is in the negative rotation state, so that the MG 21a operates as a generator and the electric power generated by the MG 21a is input to the battery 11. Therefore, in the battery state shown in (A-1) above, the input power (that is, charging power) of the battery 11 is likely to rapidly increase.

Next, referring to FIG. 1, the battery state shown in (A-2) above will be described. When the brakes of the vehicle 100 are applied by a brake device (not shown) in the battery state shown in (A-2) above, regenerative braking using the MG 21b (MG2) as a generator is executed, and regenerative charging of the battery 11 is performed by the MG 21b. As described above, even in the battery state shown in (A-2), the input power (that is, the charging power) of the battery 11 is likely to rapidly increase.

Referring again to FIG. 9 together with FIG. 1, in the present embodiment, when the state of the battery 11 is either of the states (A-1) and (A-2) described above, it is determined as YES in S112 (that the state of the battery 11 is included in the first state). In contrast, when the state of the battery 11 is neither of the states (A-1) and (A-2), it is determined as NO in S112 (that the state of the battery 11 is not included in the first state). While the regenerative charging shown in any one of (A-1) or (A-2) is being performed, it is determined as YES in S112, and when the regenerative charging is completed, it is determined as NO in S112.

When it is determined as NO in S112, the gateway ECU 60 sets in S121 the sampling rate of the battery ECU 13 to a predetermined first rate (hereinafter, referred to as "SP1"), and then in S131, uses the conversion formula F1 (FIG. 5) described above to convert IWin input from the battery pack 10 (FIG. 4) into Win, and transmits Win to the HV ECU 50. In contrast, when it is determined as YES in S112, the gateway ECU 60 sets in S122 the sampling rate of the battery ECU 13 to a predetermined second rate (hereinafter, referred to as "SP2"), and then in S132, uses the conversion formula F2 (FIG. 5) described above to convert IWin input from the battery pack 10 (FIG. 4) into Win, and transmits Win to the HV ECU 50. In the present embodiment, SP2 is higher than SP1.

As described above, in the present embodiment, when the state of the battery 11 is not included in the first state (NO in S112), the gateway ECU 60 uses the conversion formula F1 to convert IWin into Win, and when the state of the battery 11 is included in the first state (YES in S112), the gateway ECU 60 uses the conversion formula F2 to convert IWin into Win. When the state of the battery 11 is included in the first state, the conversion is performed using the conversion formula F2 instead of the conversion formula F1, so that the conversion accuracy (that is, the conversion accuracy from IWin into Win) is increased. Further, in the present embodiment, when the state of the battery 11 is included in the first state (YES in S112), the sampling rate of the battery ECU 13 (and thus the number of data of the battery sensor signals sent from the battery ECU 13 to the gateway ECU 60 per unit time) is increased compared to the case where the state of the battery 11 is not included in the first state (NO in S112). When the state of the battery 11 is included in the first state, the conversion accuracy also increases due to the higher sampling rate of the battery ECU 13.

When Win is transmitted from the gateway ECU 60 to the HV ECU 50 with the process of either S131 or S132 in FIG. 9, the HV ECU 50 sets Win received from the gateway ECU 60. By setting Win in the HV ECU 50, the process of S10 in FIG. 8 ends, and the process proceeds to S20 in FIG. 8.

Figure 11:
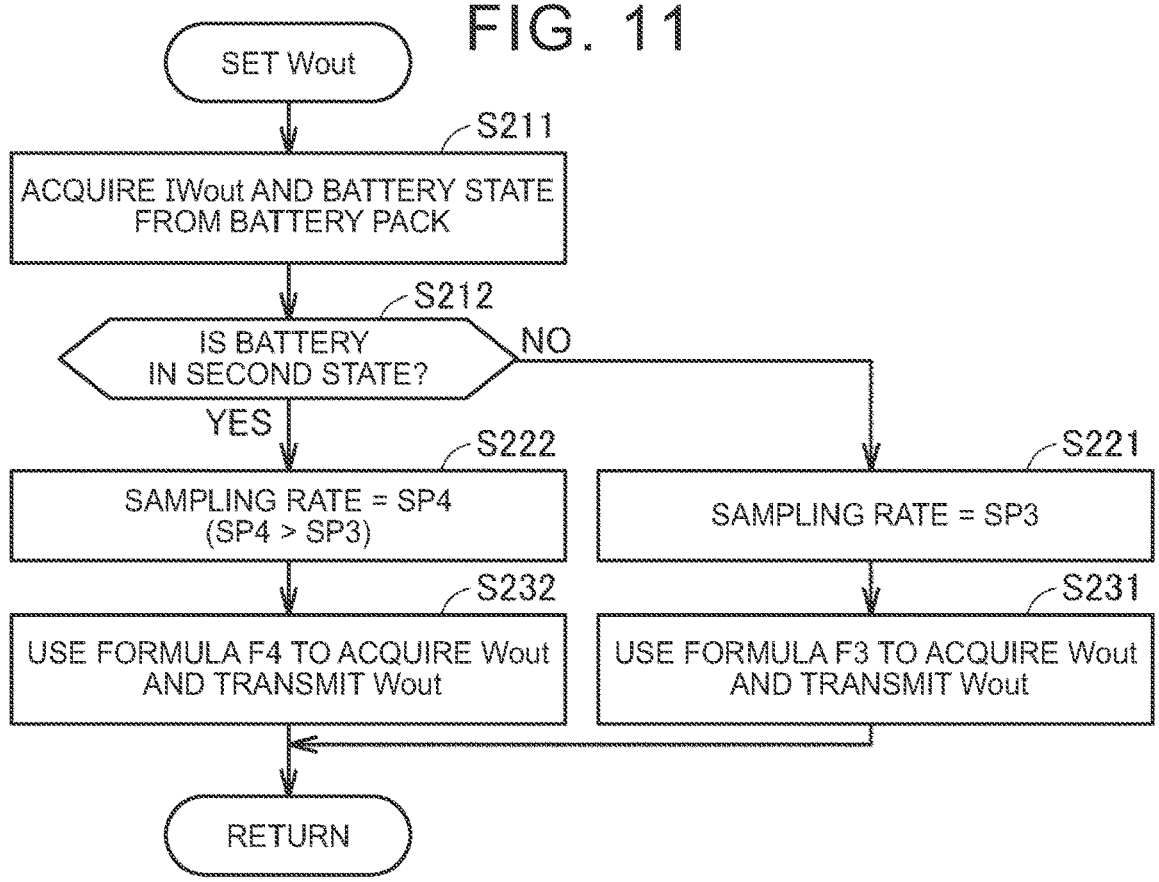
FIG. 11 is a flowchart showing details of a Wout setting process shown in FIG. 8.

In S20, the HV ECU 50 obtains Wout from the gateway ECU 60 and sets Wout. The set Wout is stored in the storage device 50*c* (FIG. 2). FIG. 11 is a flowchart showing details of the process of S20 shown in FIG. 8. The gateway ECU 60 executes a series of processes shown in FIG. 11 periodically or in response to a request from the HV ECU 50. The series of processes shown in FIG. 11 may be executed in parallel with the series of processes shown in FIG. 9.

Referring to FIG. 11 together with FIG. 1, in S211, the gateway ECU 60 acquires IWout and the detection value of the battery sensor 12 (that is, the battery sensor signals indicating the battery state) from the battery pack 10. In S212, the gateway ECU 60 determines whether the state of the battery 11 in the vehicle 100 is included in the predetermined second state. In the present embodiment, the states shown in (B-1) to (B-3) below are regarded as the second state.

(B-1) A state in which the engine 31 is cranked using the electric power of the battery 11 when the vehicle speed of the vehicle 100 is equal to or lower than a predetermined speed (including a stopped state where "vehicle speed=0").

(B-2) A state in which the supply of the electric power from the battery 11 to the auxiliary device 70 is started by starting the stopped auxiliary device 70 (more specifically, a state in which the electric power supplied to the auxiliary device 70 increases with the start of the auxiliary device 70 and until the supply of the electric power stabilizes).

(B-3) A state in which the supply of the electric power from the battery 11 to the auxiliary device 70 is stopped by stopping the operating auxiliary device 70 (more specifically, a state in which the electric power supplied to the auxiliary device 70 decreases with the stop of the auxiliary device 70 and until the supply of the electric power is stopped).

Figure 12:
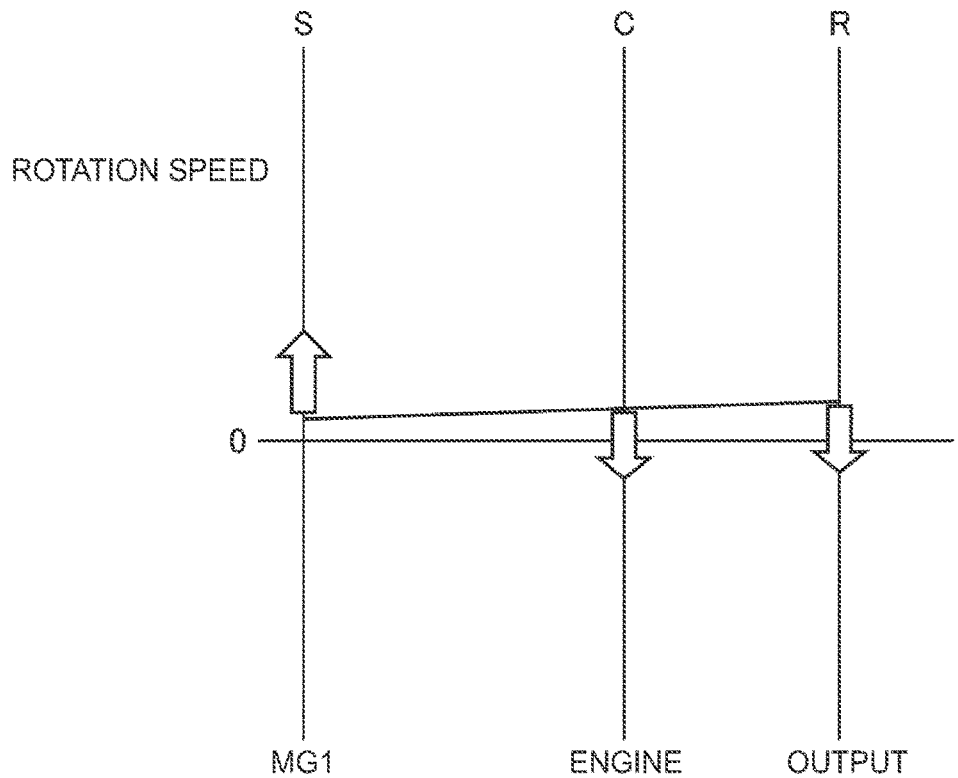
FIG. 12 is a diagram for describing a second state used in the vehicle control method according to the embodiment of the present disclosure.

Hereinafter, the battery state shown in (B-1) above will be described with reference to FIGS. 1 and 12. FIG. 12 is a collinear chart showing an example of the relationship among the rotational speeds of the sun gear S, the carrier C, and the ring gear R of the planetary gear 42 in the battery state shown in (B-1) above. Referring to FIG. 12 together with FIG. 1, in the battery state shown in (B-1) above, the sun gear S (and thus the MG 21*a*), the carrier C (and thus the engine 31), and the ring gear R are in the positive rotation state. In the battery state shown in (B-1) above, the MG 21*a* driven by the electric power of the battery 11 cranks the engine 31. As a result, a positive torque is generated in the MG 21*a*, and a negative torque acts on each of the engine 31 and the sun gear S. The electric power of the battery 11 is consumed by the MG 21*a*. Therefore, in the battery state shown in (B-1) above, the output power (that is, discharge power) of the battery 11 is likely to rapidly increase.

At low vehicle speeds, the MG 21*a* (MG1) momentarily enters a state of negative rotation and positive torque (power generation state), but immediately enters a state of positive rotation and positive torque (discharge state). In contrast, at high vehicle speeds, the MG 21*a* (MG1) continues the state of negative rotation and positive torque (power generation state) even when the engine 31 is started.

When the stopped auxiliary device 70 (for example, the air conditioner) is started as shown in (B-2) above, the auxiliary device 70 consumes the electric power of the battery 11. Therefore, in the battery state shown in (B-2) above, the output power (that is, the discharge power) of the battery 11 is likely to rapidly increase. On the other hand, when the operating auxiliary device 70 (for example, the air conditioner) is stopped as shown in (B-3) above, the auxiliary device 70 does not consume the electric power of the battery 11. Therefore, in the battery state shown in (B-3) above, the output power (that is, the discharge power) of the battery 11 is likely to rapidly decrease.

Referring again to FIG. 11 together with FIG. 1, when the state of the battery 11 is any one of the states (B-1) to (B-3) described above, it is determined as YES in S212 (that the state of the battery 11 is included in the second state). In contrast, when the state of the battery 11 is not any of the states (B-1) to (B-3), it is determined as NO in S212 (that the state of the battery 11 is not included in the second state).

When it is determined as NO in S212, the gateway ECU 60 sets in S221 the sampling rate of the battery ECU 13 to a predetermined third rate (hereinafter, referred to as "SP3"), and then in S231, uses the conversion formula F3 (FIG. 5) described above to convert IWout input from the battery pack 10 (FIG. 4) into Wout, and transmits Wout to the HV ECU 50. In contrast, when it is determined as YES in S212, the gateway ECU 60 sets in S222 the sampling rate of the battery ECU 13 to a predetermined fourth rate (hereinafter, referred to as "SP4"), and then in S232, uses the conversion formula F4 (FIG. 5) described above to convert IWout input from the battery pack 10 (FIG. 4) into Wout, and transmits Wout to the HV ECU 50. In the present embodiment, SP4 is higher than SP3. SP3 may be the same as SP1 shown in FIG. 9 or may be different. SP4 may be the same as SP2 shown in FIG. 9 or may be different.

As described above, in the present embodiment, when the state of the battery 11 is not included in the second state (NO in S212), the gateway ECU 60 uses the conversion formula F3 to convert IWout into Wout, and when the state of the battery 11 is included in the second state (YES in S212), the gateway ECU 60 uses the conversion formula F4 to convert IWout into Wout. When the state of the battery 11 is included in the second state, the conversion is performed using the conversion formula F4 instead of the conversion formula F3, so that the conversion accuracy (that is, the conversion accuracy from IWout into Wout) is increased. Further, in the present embodiment, when the state of the battery 11 is included in the second state (YES in S212), the sampling rate of the battery ECU 13 (and thus the number of data of the battery sensor signals sent from the battery ECU 13 to the gateway ECU 60 per unit time) is increased compared to the case where the state of the battery 11 is not included in the second state (NO in S212). When the state of the battery 11 is included in the second state, the conversion accuracy increases due to the higher sampling rate of the battery ECU 13.

When Wout is transmitted from the gateway ECU 60 to the HV ECU 50 with the process of either S231 or S232 in FIG. 11, the HV ECU 50 sets Wout received from the gateway ECU 60. By setting Wout in the HV ECU 50, the process of S20 in FIG. 8 ends, and the process proceeds to S30 in FIG. 8.

Referring again to FIG. 8 together with FIG. 1, in S30, the HV ECU 50 uses Win set by the process in FIG. 9 to control the input power of the battery 11 and uses Wout set by the process in FIG. 11 to control the output power of the battery 11. More specifically, the HV ECU 50 creates the control commands $S_{M1}$, $S_{M2}$, and $S_E$ (FIG. 4) for the MG 21a, the MG 21b, and the engine 31, respectively, so that the input power and the output power of the battery 11 do not exceed Win and Wout, respectively. The HV ECU 50 transmits the created control commands $S_{M1}$, $S_{M2}$, and $S_E$ to the motor ECU 23 and the engine ECU 33. The motor ECU 23 and the engine ECU 33 control the MG 21a, the MG 21b, and the engine 31 according to the control commands $S_{M1}$, $S_{M2}$, and $S_E$, so that the input power and the output power of the battery 11 are controlled so as not to exceed Win and Wout, respectively. By executing the process of S30 in FIG. 8, the process is returned to the main routine (not shown).

As described above, the vehicle 100 according to the present embodiment includes the battery pack 10 including the battery ECU 13, and the HV ECU 50 and the gateway ECU 60 that are provided separately from the battery pack 10. The gateway ECU 60 is configured to relay communication between the battery ECU 13 and the HV ECU 50. The battery pack 10 is configured to output IWin and IWout. The conversion unit 600 is included in the gateway ECU 60. The conversion unit 600 selects a conversion formula from the options (for example, the conversion formulas F1 to F4 shown in FIG. 5) according to the situation, and uses the selected conversion formula to convert IWin and IWout into Win and Wout, respectively.

Since the vehicle 100 includes the conversion unit 600, IWin and IWout output from the current restricting battery pack (for example, the battery pack 10) can be converted into Win and Wout, respectively. Thus, the HV ECU 50 can appropriately perform the power-based input restriction and the power-based output restriction using Win and Wout.

In the present embodiment, when the state of the battery 11 is any one of the states (A-1) and (A-2) described above, it is typically required to severely control the input current of the battery 11. Therefore, the conversion unit 600 selects the conversion formula F2 with high conversion accuracy when the battery 11 is in any one of the states (A-1) and (A-2) described above (YES in S112 in FIG. 9), and uses the conversion formula F2 to convert IWin into Win. Further, when the state of the battery 11 is any one of the states (B-1) to (B-3) described above, it is typically required to severely control the output current of the battery 11. Therefore, the conversion unit 600 selects the conversion formula F4 with high conversion accuracy when the battery 11 is in any one of the states (B-1) to (B-3) described above (YES in S212 in FIG. 11), and uses the conversion formula F4 to convert IWout into Wout. By using the conversion formulas F2 and F4 with high conversion accuracy, the conversion into Win and Wout corresponding to IWin and IWout is performed with high accuracy. By controlling the battery power using Win and Wout corresponding to IWin and IWout, the controllability of the current of the battery 11 is improved.

When the state of the battery 11 is neither of the states (A-1) and (A-2) described above, it is typically not required to severely control the input current of the battery 11. Therefore, the conversion unit 600 selects the conversion formula F1 with small calculation load (that is, a conversion formula with low conversion accuracy) when the battery 11 is in neither of the states (A-1) and (A-2) described above (NO in S112 in FIG. 9), and uses the conversion formula F1 to convert IWin into Win. Further, when the state of the battery 11 is not any of the states (B-1) to (B-3) described above, it is typically not required to severely control the output current of the battery 11. Therefore, when the state of the battery 11 is not any of the states (B-1) to (B-3) described above (NO in S212 in FIG. 11), the conversion unit 600 selects the conversion formula F3 with a small calculation load (that is, a conversion formula with low conversion accuracy), and uses the conversion formula F3 to convert IWout into Wout. By using the conversion formulas F1 and F3 having a small calculation load, the calculation load of the conversion unit 600 can be reduced.

As described above, the conversion unit 600 according to the present embodiment can perform conversion from IWin, IWout into Win, Wout, respectively, using a conversion formula suitable for the situation.

The control parts included in the vehicle 100 may be modularized in predetermined units to form a vehicle control system.

Figure 13:
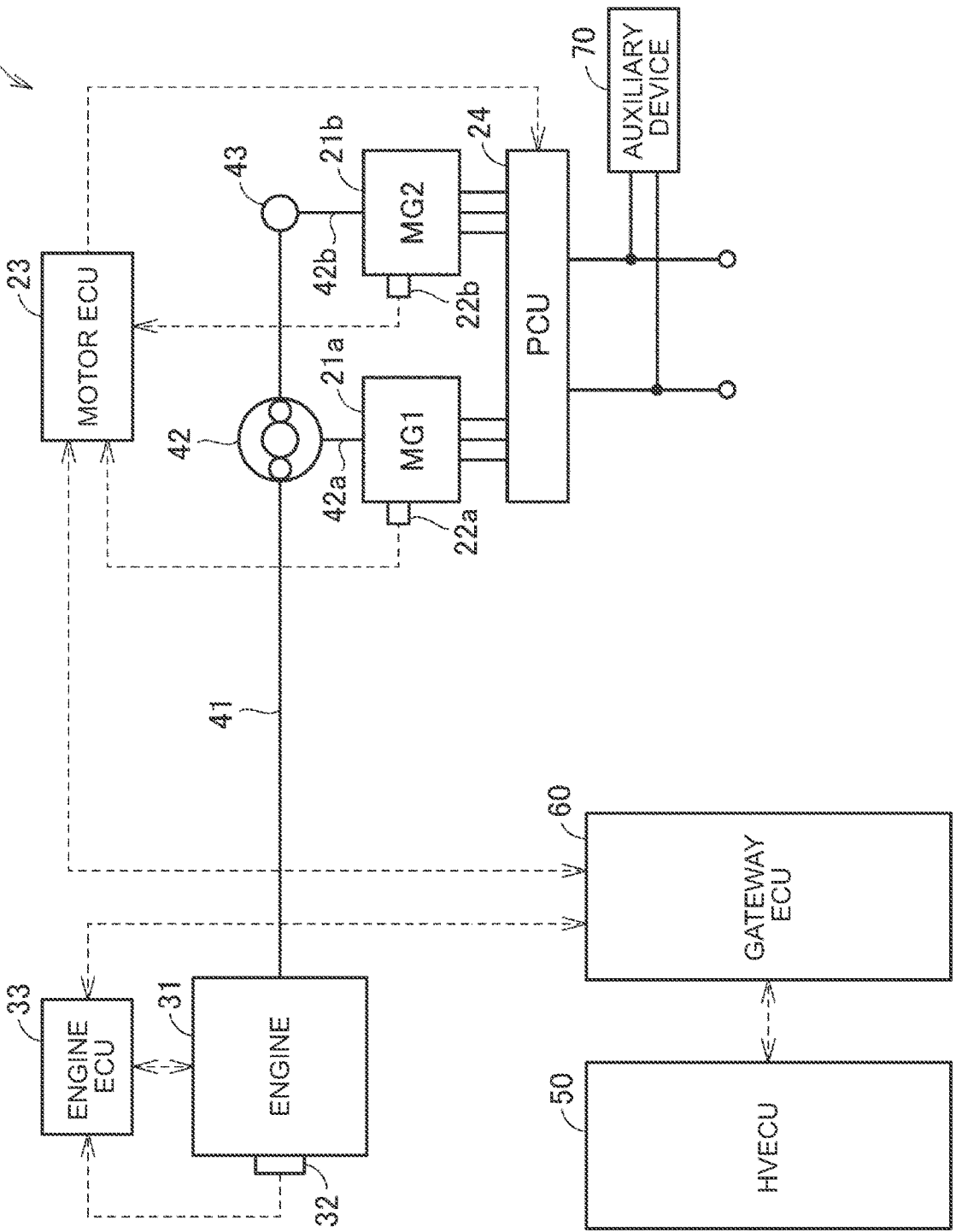
FIG. 13 is a diagram showing a first example of a vehicle control system according to the embodiment of the present disclosure.

FIG. 13 is a diagram showing a first example of the vehicle control system. Referring to FIG. 13, a vehicle control system 201 includes the MGs 21a and 21b, the motor sensors 22a and 22b, the motor ECU 23, the PCU 24, the engine 31, the engine sensor 32, the engine ECU 33, the planetary gear 42, and the HV ECU 50, the gateway ECU 60, and the auxiliary device 70 that are modularized. The vehicle control system 201 is configured so that the battery pack 10 (FIG. 4) can be attached.

Figure 14:
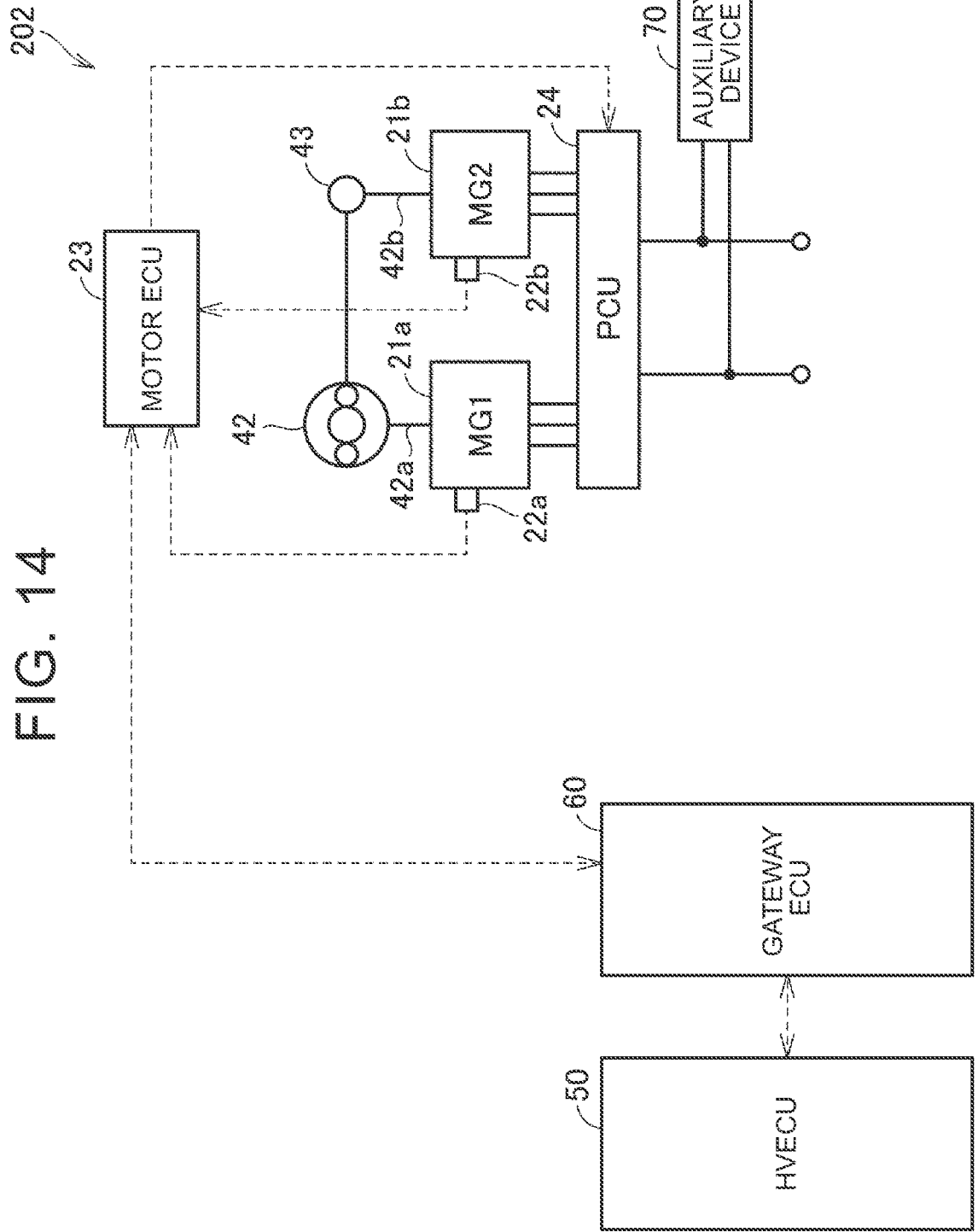
FIG. 14 is a diagram showing a second example of the vehicle control system according to the embodiment of the present disclosure.

FIG. 14 is a diagram showing a second example of the vehicle control system. Referring to FIG. 14, a vehicle control system 202 is configured by modularizing the control parts of the vehicle control system 201, excluding the engine control parts (that is, the engine 31, the engine sensor 32, and the engine ECU 33). The vehicle control system 202 is configured so that the battery pack 10 (FIG. 4) and the engine control parts can be attached.

The modularized vehicle control system can be treated as one component. Modularization of the control parts as described above facilitates manufacture of the vehicle. Modularization also enables parts to be shared between different vehicle models.

The vehicle control systems 201 and 202 each include the HV ECU 50 and the gateway ECU 60. When the battery pack 10 (FIG. 4) is attached to each of the vehicle control systems 201 and 202, the HV ECU 50 controls the input power of the battery 11 so that the input power of the battery 11 does not exceed Win and controls the output power of the battery 11 so that the output power of the battery 11 does not exceed Wout. In the vehicle control system 201, 202, the HV ECU 50 can be regarded as an example of the "control unit" according to the present disclosure. The selection units 611 and 621 (FIG. 5) of the gateway ECU 60 select a conversion formula from options (for example, the conversion formulas F1 to F4 shown in FIG. 5) depending on the situation. The calculation units 613 and 623 (FIG. 5) of the gateway ECU 60 use the conversion formula selected by the selection units 611 and 621 to convert IWin and IWout input from the battery pack 10 into Win and Wout, respectively, and output the obtained Win and Wout to the HV ECU 50. In the vehicle control system 201, 202, the gateway ECU 60 can be regarded as an example of the "conversion unit" according to the present disclosure.

In addition, the vehicle control systems 201 and 202 to which the battery pack 10 is attached can control the input power and the output power of the battery 11 by the vehicle control method including the first to fourth steps described below.

In the first step (for example, S111 in FIG. 9 and S211 in FIG. 11), the vehicle control system 201, 202 acquires IWin, IWout, and the detection value (battery sensor signals) of the battery sensor 12 from the battery pack 10. In the second step (for example, S112 in FIG. 9 and S212 in FIG. 11), the vehicle control system 201, 202 selects a conversion formula from options (for example, the conversion formulas F1 to F4 shown in FIG. 5). For example, when it is determined as YES in S112 in FIG. 9, the conversion formula F2 is selected, and when it is determined as NO in S112 in FIG. 9, the conversion formula F1 is selected. When it is determined as YES in S212 in FIG. 11, the conversion formula F4 is selected, and when it is determined as NO in S212 in FIG. 11, the conversion formula F3 is selected. In the third step (for example, S131 and S132 in FIG. 9 and S231 and S232 in FIG. 11), the vehicle control system 201, 202 uses the conversion formula selected in the second step to convert IWin and IWout obtained from the battery pack 10 to Win and Wout, respectively. In the fourth step (for example, S30 in FIG. 8), the vehicle control system 201, 202 uses Win and Wout obtained in the third step to control the input power and the output power of the battery 11.

According to the above vehicle control method, the vehicle control system 201, 202 can appropriately perform the power-based input restriction and the power-based output restriction on the battery 11 included in the current restricting battery pack 10.

In the present embodiment, the sampling rate of the battery ECU 13 is variable, but the sampling rate of the battery ECU 13 may be constant (a fixed value). S121 and S122 in the process of FIG. 9 and S221 and S222 in the process of FIG. 11 can be omitted.

In the present embodiment, the states shown in (A-1) and (A-2) above are regarded as the first state, and the states shown in (B-1) to (B-3) above are regarded as the second state. However, each of the first state and the second state can be set as desired. For example, only one of the above (A-1) and (A-2) may be regarded as the first state. Further, only one of the above (B-1) to (B-3) may be regarded as the second state.

Further, the first state may be a state of the secondary battery (battery state) in which the input power (that is, the charging power) of the secondary battery rapidly increases and/or decreases. In such a battery state, when the power-based input restriction is performed using the first power upper limit value obtained by conversion with the first conversion formula, the input current of the secondary battery is likely to become excessively large or excessively small. The first state may include a battery state in which the charging power of the secondary battery is increased by regenerative charging (for example, a battery state in which regenerative charging is performed by sudden braking). The second state may be a state of the secondary battery (battery state) in which the output power (that is, the discharge power) of the secondary battery rapidly increases and/or decreases. In such a battery state, when the power-based output restriction is performed using the second power upper limit value obtained by conversion with the third conversion formula, the output current of the secondary battery is likely to become excessively large or excessively small. For example, the second state may include a battery state at the time of starting or stopping a predetermined auxiliary device (for example, an air conditioner, a lighting device, or a wiper) driven by the electric power of the secondary battery. Further, in the hybrid vehicle (HV), the second state may include the battery state at the time of engine cranking (that is, at the time of engine start) using the electric power of the secondary battery.

The auxiliary device 70 is not limited to the air conditioner, and may include other auxiliary devices (for example, at least one of the lighting device and the wiper) that are driven by the electric power of the battery 11. The auxiliary device 70 may be supplied with electric power of a voltage lower than that of the battery 11 (for example, electric power obtained by stepping down the electric power of the battery 11 with the direct current-direct current (DC-DC) converter).

Figure 15:
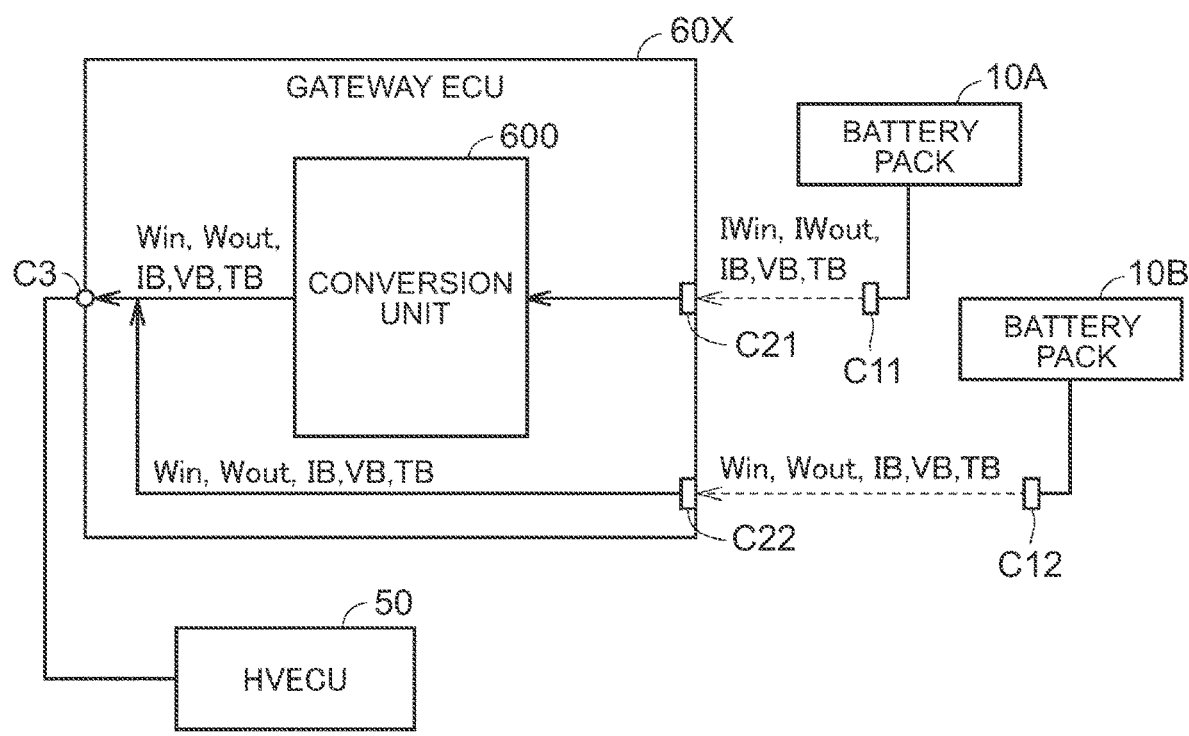
FIG. 15 is a diagram showing a modified example of the gateway ECU shown in FIG. 4.

In the above-described embodiment, when the current restricting battery pack is connected to the power restricting control device, the gateway ECU 60 is adopted so that the power-based input restriction and the power-based output restriction are performed on the secondary battery included in the current restricting battery pack. That is, in the above-described embodiment, the gateway ECU 60 that is configured to be connectable to the current restricting battery pack and that cannot be connected to the power restricting battery pack is adopted. However, the present disclosure is not limited to this, and a gateway ECU 60X shown in FIG. 15 may be adopted instead of the gateway ECU 60 adopted in the above-described embodiment. FIG. 15 is a diagram showing a modified example of the gateway ECU 60 shown in FIG. 4.

Referring to FIG. 15, the gateway ECU 60X includes a connector C21 for connecting a battery pack 10A to the gateway ECU 60X and a connector C22 for connecting a battery pack 10B to the gateway ECU 60X. The battery pack 10A is a current restricting battery pack that includes a connector C11 for external connection and that outputs IWin, IWout, and the battery sensor signals to the connector C11. The battery pack 10B is a power restricting battery pack that includes a connector C12 for external connection and that outputs Win, Wout, and the battery sensor signals to the connector C12. The HV ECU 50 is connected to an output port C3 of the gateway ECU 60X via a signal line.

When the connector C11 of the battery pack 10A is connected to the connector C21 of the gateway ECU 60X, IWin, IWout, and the battery sensor signals are input from the battery pack 10A to the connector C21. Then, the conversion unit 600 of the gateway ECU 60X converts IWin and IWout into Win and Wout, respectively, and Win, Wout, and the battery sensor signals are output to the output port C3. Then, Win, Wout, and the battery sensor signals are output from the gateway ECU 60X to the HV ECU 50.

On the other hand, when the connector C12 of the battery pack 10B is connected to the connector C22 of the gateway ECU 60X, Win, Wout, and the battery sensor signals are input from the battery pack 10B to the connector C22. The gateway ECU 60X outputs Win, Wout, and the battery sensor signals input to the connector C22 as they are to the output port C3. That is, the above conversion is not performed. Then, Win, Wout, and the battery sensor signals are output from the gateway ECU 60X to the HV ECU 50.

As described above, when IWin and IWout are input, the gateway ECU 60X according to this modified example performs the conversion in accordance with the conversion formulas selected by the selection units 611 and 621 (FIG. 5) to output Win and Wout. When Win and Wout are input, the gateway ECU 60X outputs Win and Wout without performing the above conversion. In a vehicle including the gateway ECU 60X, Win and Wout are output from the gateway ECU 60X in both a case where the current restricting battery pack 10A is used and a case where the power restricting battery pack 10B is used. Thus, in such a vehicle, the HV ECU 50 can appropriately perform the power-based input restriction and the power-based output restriction in both a case where the current restricting battery pack 10A is adopted and a case where the power restricting battery pack 10B is adopted.

In the example shown in FIG. 15, the gateway ECU 60X separately includes an input port for a current restricting battery pack (connector C21) and an input port for a power restricting battery pack (connector C22). However, the gateway ECU may be configured to be connectable to both the current restricting battery pack and the power restricting battery pack in another form. For example, the gateway ECU may include one input port to which both the current restricting battery pack and the power restricting battery pack are connected. The gateway ECU may be configured to recognize whether the battery pack is the current restricting battery pack or the power restricting battery pack in the initial process when the battery pack is connected to the input port. When the battery pack connected to the input port is the current restricting battery pack, the gateway ECU may activate a conversion logic (for example, the conversion unit 600 shown in FIG. 15) to convert IWin and IWout input thereto into Win and Wout, respectively, and output Win and Wout to the output port. On the other hand, when the battery pack connected to the input port is the power restricting battery pack, the gateway ECU may directly output Win and Wout input thereto to the output port without activating the conversion logic.

Figure 16:
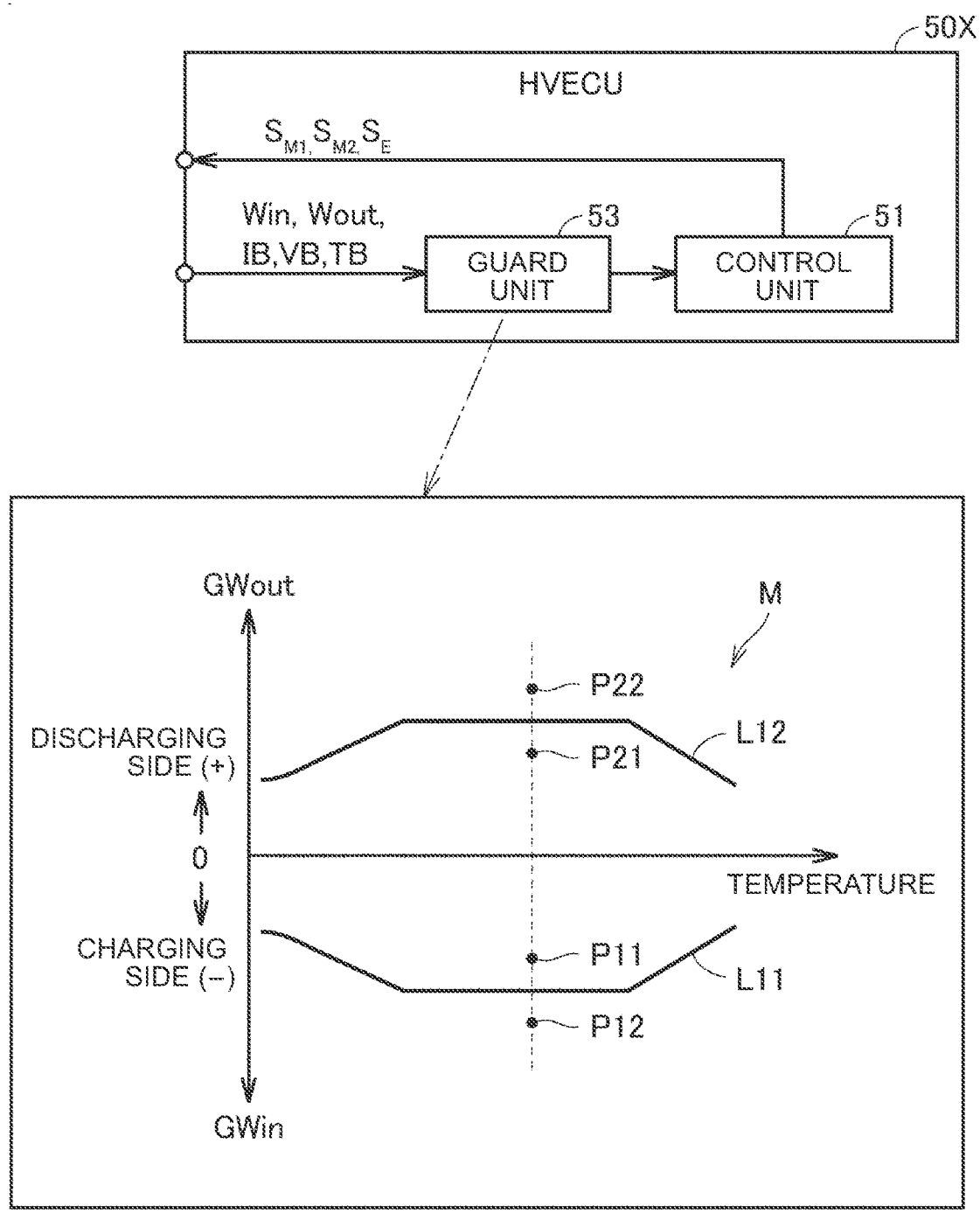
FIG. 16 is a diagram showing a modified example of the HV ECU shown in FIG. 4.

In the above-described embodiment, the number of power upper limit values required for the input restriction of the battery 11 is one, and the number of power upper limit values required for the output restriction of the battery 11 is also one. However, the present disclosure is not limited to this, and the input restriction may be performed using a plurality of power upper limit values, and the output restriction may be performed using a plurality of power upper limit values. For example, an HV ECU 50X shown in FIG. 16 may be adopted instead of the HV ECU 50 adopted in the above embodiment. FIG. 16 is a diagram showing a modified example of the HV ECU 50 shown in FIG. 4.

Referring to FIG. 16 together with FIG. 4, the hardware configuration of the HV ECU 50X is the same as the configuration of the HV ECU 50 shown in FIG. 2. However, the HV ECU 50X includes a guard unit 53 in addition to the control unit 51. In the HV ECU 50X, for example, the control unit 51 and the guard unit 53 are implemented by the processor 50a shown in FIG. 2 and the program executed by the processor 50a. However, the present disclosure is not limited to this, and the control unit 51 and the guard unit 53 may be implemented by dedicated hardware (electronic circuit).

Win, Wout, and the battery sensor signals are input to the HV ECU 50X from the gateway ECU 60 shown in FIG. 4, for example. The guard unit 53 uses a map M to obtain a third power upper limit value (hereinafter, also referred to as "GWin") indicating the upper limit value of the input power of the battery 11 and a fourth power upper limit value (hereinafter, also referred to as "GWout") indicating the upper limit value of the output power of the battery 11. GWin is a guard value for Win, and when Win is an abnormal value (more specifically, an excessively large value), GWin restricts the input power of the battery 11 instead of Win. GWout is a guard value for Wout, and when Wout is an abnormal value (more specifically, an excessively large value), GWout restricts the output power of the battery 11 instead of Wout.

The map M is information indicating the relationship between the temperature of the battery 11 and each of GWin and GWout, and is stored in the storage device 50c (FIG. 2) in advance. A line L11 in the map M indicates the relationship between the temperature of the battery 11 and GWin. A line L12 in the map M indicates the relationship between the temperature of the battery 11 and GWout.

The guard unit 53 refers to the map M to acquire GWin and GWout in accordance with the current temperature of the battery 11. Then, the guard unit 53 outputs the smaller one of Win and GWin to the control unit 51, and outputs the smaller one of Wout and GWout to the control unit 51. For example, when the temperature of the battery 11 and Win are in a state P11 in the map M, Win is output to the control unit 51, and when the temperature of the battery 11 and Win are in a state P12 in the map M, GWin (line L11) is output to the control unit 51. Hereinafter, the situation where Win exceeds GWin (for example, the situation where the state P12 is established) may be referred to as "Win with guard". When the temperature of the battery 11 and Wout are in a state P21 in the map M, Wout is output to the control unit 51, and when the temperature of the battery 11 and Wout are in a state P22 in the map M, GWout (line L12) is output to the control unit 51. Hereinafter, the situation where Wout exceeds GWout (for example, the situation where the state P22 is established) may be referred to as "Wout with guard".

The temperature of the battery 11 that is used to acquire GWin and GWout is a measured value of the temperature of the battery 11 detected by the temperature sensor 12c shown in FIG. 4, for example. For example, any one of an average cell temperature, a maximum cell temperature, and a minimum cell temperature may be adopted as the temperature of the battery 11.

In addition to the power upper limit value, the battery sensor signals are also output from the guard unit 53 to the control unit 51. The control unit 51 controls the input power and the output power of the battery 11 using the power upper limit values received from the guard unit 53. More specifically, the control unit 51 creates the control commands $S_{M1}$, $S_{M2}$ for the MG 21a, the MG 21b and the control command $S_E$ for the engine 31 shown in FIG. 1 so that the input power and the output power of the battery 11 do not exceed the power upper limit values. The control unit 51 controls the input power of the battery 11 so that the input power of the battery 11 does not exceed the smaller one of Win and GWin. As a result, the input power of the battery 11 exceeds neither Win nor GWin. The control unit 51 controls the output power of the battery 11 so that the output power of the battery 11 does not exceed the smaller one of Wout and GWout. As a result, the output power of the battery 11 exceeds neither Wout nor GWout.

The guard unit 53 may record Win with guard and Wout with guard in the storage device 50c (FIG. 2) and determine, based on the recorded data, conformity/nonconformity of the battery pack mounted on the vehicle (for example, the battery pack 10 shown in FIG. 4). For example, the guard unit 53 may determine that the battery pack is nonconforming when at least one of the frequency of "Win with guard" and the frequency of "Wout with guard" exceeds a predetermined value. In addition, the guard unit 53 may determine that the battery pack is nonconforming when at least one of the duration for which the state "Win with guard" continues and the duration for which the state "Wout with guard" continues exceeds a predetermined value.

The HV ECU 50X may record the determination result of conformity/nonconformity of the battery pack in the storage device 50c (FIG. 2). In addition, the HV ECU 50X may notify a user of the nonconformity when it is determined that the battery pack is nonconforming. This notification may prompt the user to replace the battery pack. The notification process to the user is optional, and the notification may be carried out by display (for example, display of characters or images) on a display device, by sound (including voice) from a speaker, or by lighting (including blinking) of a predetermined lamp.

According to the modified example shown in FIG. 16, it is possible to protect the battery 11 with GWin and GWout when Win and Wout become excessively large values for some reason.

In the above-described embodiment, the gateway ECU 60 includes the conversion unit 600. However, the present disclosure is not limited to this, and another ECU may have these functions.

Figure 17:
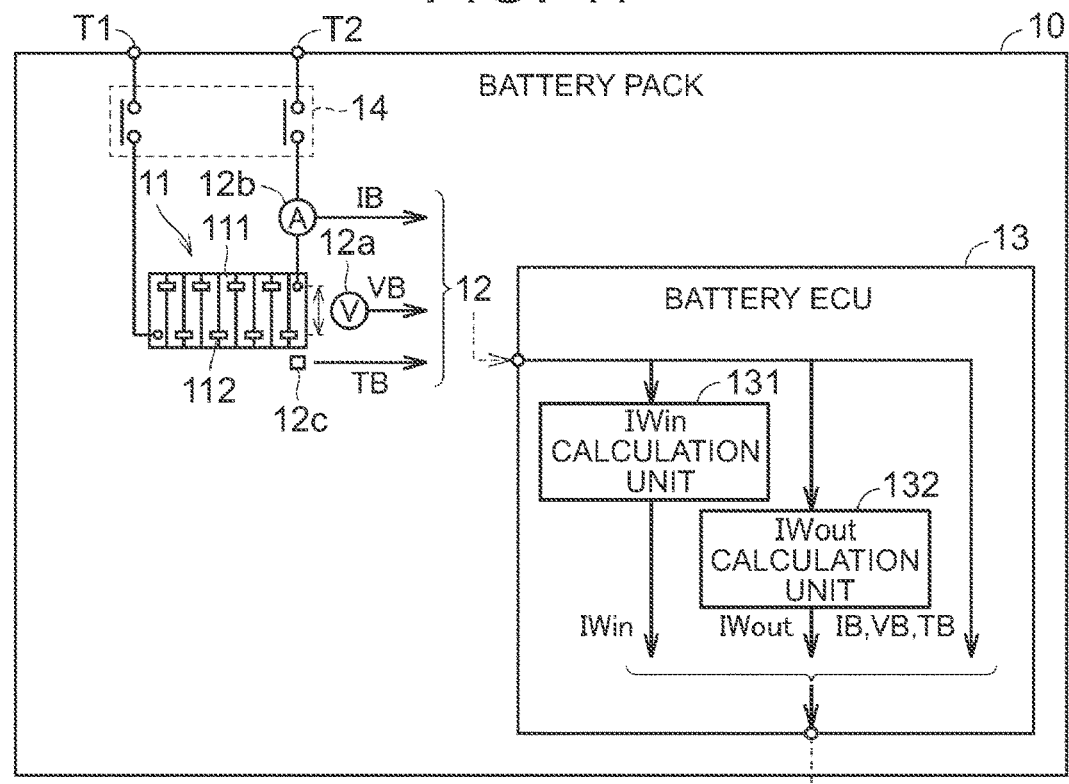
FIG. 17 is a diagram showing a first modified example of the vehicle control system shown in FIG. 4.
Figure 17:
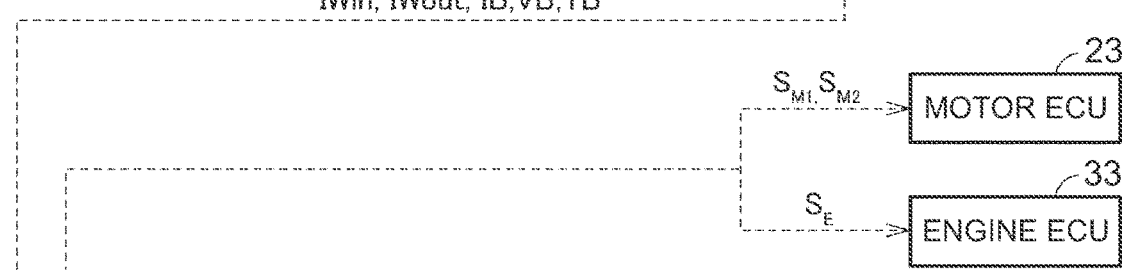
Figure 17:
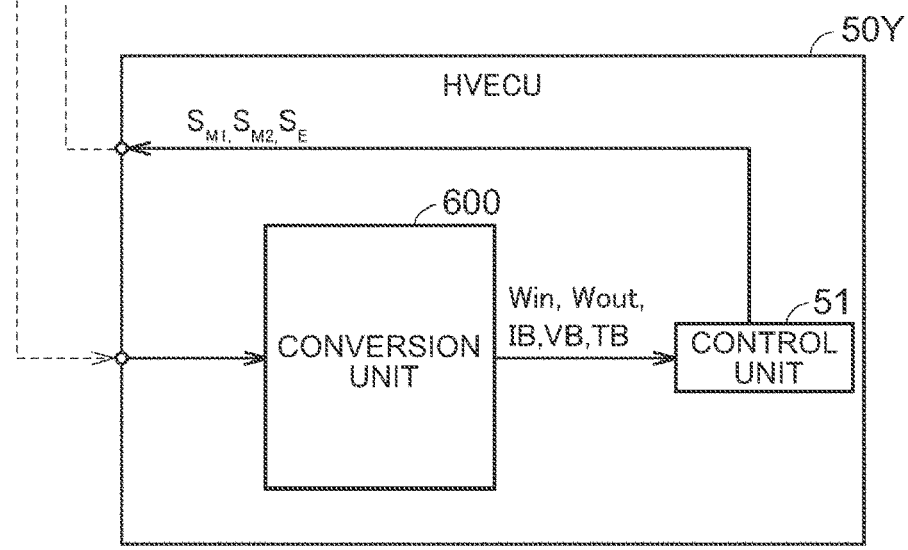

FIG. 17 is a diagram showing a first modified example of the vehicle control system shown in FIG. 4. Referring to FIG. 17, the vehicle control system according to the first modified example is the same as the vehicle control system shown in FIG. 4 except that an HV ECU 50Y is adopted instead of the HV ECU 50 and the gateway ECU 60 is omitted. The hardware configuration of the HV ECU 50Y is the same as the configuration of the HV ECU 50 shown in FIG. 2. However, the HV ECU 50Y includes the conversion unit 600 (see FIG. 5) in addition to the control unit 51. In the HV ECU 50Y, for example, the control unit 51 and the conversion unit 600 are implemented by the processor 50a shown in FIG. 2 and the program executed by the processor 50a. However, the present disclosure is not limited to this, and the control unit 51 and the conversion unit 600 may be implemented by dedicated hardware (electronic circuit).

The battery pack 10 outputs IWin, IWout, and the battery sensor signals to the HV ECU 50Y. The conversion unit 600 of the HV ECU 50Y converts IWin and IWout input from the battery pack 10 into Win and Wout, respectively. Win and Wout are input from the conversion unit 600 to the control unit 51. The control unit 51 creates the control commands $S_{M1}$, $S_{M2}$, and $S_E$ for the MG 21a, the MG 21b, and the engine 31 shown in FIG. 1, respectively, and outputs the control commands $S_{M1}$ and $S_{M2}$ to the motor ECU 23 and outputs the control command $S_E$ to the engine ECU 33, so that the input power and the output power of the battery 11 do not exceed Win and Wout, respectively.

In the vehicle control system according to the first modified example, the HV ECU 50Y provided separately from the battery pack 10 includes a converter (that is, the conversion unit 600), and the converter converts IWin and IWout into Win and Wout. Thus, the converter can be mounted on the vehicle without a change in the configuration of the battery pack 10. Further, the HV ECU 50Y can appropriately perform the power-based input restriction and the power-based output restriction without adding the gateway ECU 60 (FIG. 4) described above.

Figure 18:
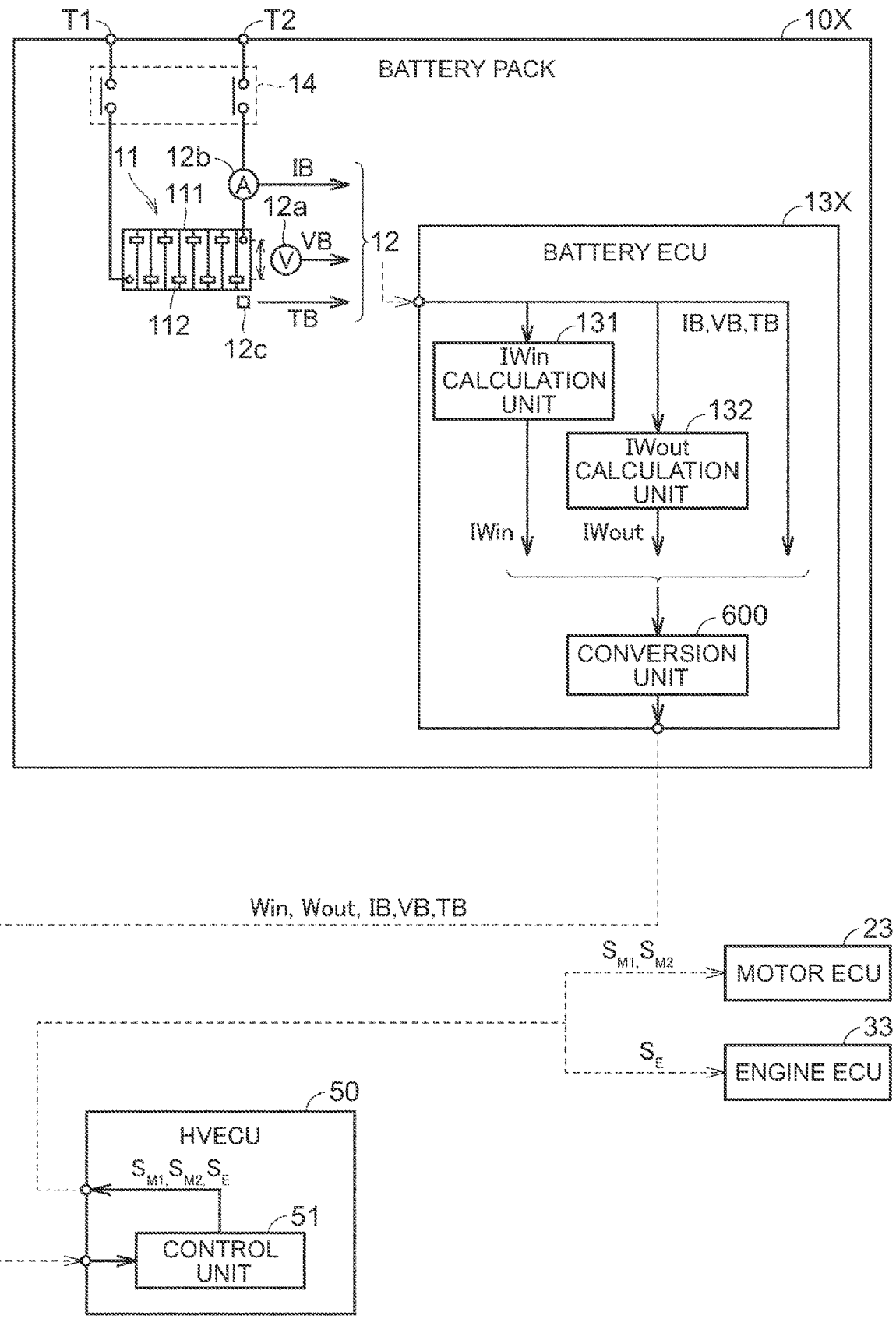
FIG. 18 is a diagram showing a second modified example of the vehicle control system shown in FIG. 4.

FIG. 18 is a diagram showing a second modified example of the vehicle control system shown in FIG. 4. Referring to FIG. 18, the vehicle control system according to the second modified example is the same as the vehicle control system shown in FIG. 4 except that a battery pack 10X (including a battery ECU 13X) is adopted instead of the battery pack 10 (including the battery ECU 13) and the gateway ECU 60 is omitted. The hardware configuration of the battery ECU 13X included in the battery pack 10X is the same as the configuration of the battery ECU 13 shown in FIG. 2. However, the battery ECU 13X includes the conversion unit 600 (see FIG. 5) in addition to the IWin calculation unit 131 and the IWout calculation unit 132. In the battery ECU 13X, for example, the IWin calculation unit 131, the IWout calculation unit 132, the conversion unit 600 are implemented by the processor 13a shown in FIG. 2 and the program executed by the processor 13a. However, the present disclosure is not limited to this, and the IWin calculation unit 131, the IWout calculation unit 132, the conversion unit 600 may be implemented by dedicated hardware (electronic circuit).

The conversion unit 600 of the battery ECU 13X receives IWin and IWout from the IWin calculation unit 131 and the IWout calculation unit 132, respectively, and converts IWin and IWout into Win and Wout. The battery pack 10X outputs Win, Wout, and the battery sensor signals to the HV ECU 50. The control unit 51 of the HV ECU 50 creates the control commands $S_{M1}$, $S_{M2}$, and $S_E$ for the MG 21a, the MG 21b, and the engine 31 shown in FIG. 1, respectively, and outputs the control commands $S_{M1}$ and $S_{M2}$ to the motor ECU 23 and outputs the control command $S_E$ to the engine ECU 33, so that the input power and the output power of the battery 11 do not exceed Win and Wout, respectively.

In the vehicle control system according to the second modified example, the converter (that is, the conversion unit 600) is incorporated in the battery ECU 13X (that is, inside the battery pack 10X). With this configuration, IWin and IWout are converted into Win and Wout inside the battery pack 10X, and Win and Wout can be output from the battery pack 10X. Therefore, the HV ECU 50 can appropriately perform the power-based input restriction and the power-based output restriction without adding the above-described gateway ECU 60 (FIG. 4).

In the above-described embodiment and each modified example, the output restriction of the secondary battery is performed conforming to the input restriction of the secondary battery, but the input restriction of the secondary battery and the output restriction of the secondary battery can be performed in a different mode. For example, in the conversion from IWin into Win, one conversion formula selected from the options including two or more conversion formulas (for example, the conversion formulas F1 and F2 shown in FIG. 5) may be used, and in the conversion from IWout into Wout, one conversion formula (for example, the conversion formula F3 or F4 shown in FIG. 5) may always be used. Further, in the conversion from IWout into Wout, one conversion formula selected from the options including two or more conversion formulas (for example, the conversion formulas F3 and F4 shown in FIG. 5) may be used, and in the conversion from IWin into Win, one conversion formula (for example, the conversion formula F1 or F2 shown in FIG. 5) may always be used.

In the above-described embodiment and each modified example, the battery ECU 13, the motor ECU 23, and the engine ECU 33 are connected to the local bus B1 (see FIG. 2). However, the present disclosure is not limited to this, and the motor ECU 23 and the engine ECU 33 may be connected to the global bus B2.

The configuration of the vehicle is not limited to the configuration shown in FIG. 1. For example, although a hybrid vehicle is shown in FIG. 1, the vehicle is not limited to the hybrid vehicle and may be an electric vehicle on which an engine is not mounted. Further, the vehicle may be a plug-in hybrid vehicle (PHV) configured such that the secondary battery in the battery pack can be charged using electric power supplied from the outside of the vehicle. Further, the HV ECU 50 may be configured to directly control the SMR 14 bypassing the battery ECU 13. The battery 11 (secondary battery) included in the battery pack 10 is not limited to the assembled battery and may be a single battery.

The third control device according to the present disclosure can also be used for purposes other than the conversion of the upper limit value (that is, conversion from the current upper limit value into the power upper limit value). The third control device may be configured to manage information (for example, accumulate vehicle data). Further, the third control device may function as a central gateway (CGW).

The modified examples described above may be implemented in any combination. The embodiment disclosed herein should be considered as illustrative and not restrictive in all respects. The scope of the present disclosure is shown by the claims, rather than the above embodiment, and is intended to include all modifications within the meaning and the scope equivalent to those of the claims.

What is claimed is:

1. A vehicle comprising:
a battery pack including a secondary battery, a battery sensor configured to detect a state of the secondary battery, and a first control device, the first control device being configured to use a detection value of the battery sensor to obtain at least one of a first current upper limit value indicating an upper limit value of an input current of the secondary battery and a second current upper limit value indicating an upper limit value of an output current of the secondary battery;
a second control device provided separately from the battery pack, the second control device being configured to use at least one of a first power upper limit value indicating an upper limit value of an input power of the secondary battery and a second power upper limit value indicating an upper limit value of an output power of the secondary battery to control at least one of the input power of the secondary battery and the output power of the secondary battery; and
a converter configured to select a conversion formula from options depending on a situation and to use the conversion formula that has been selected to perform conversion of at least one of the first current upper limit value and the second current upper limit value into at least one of the first power upper limit value and the second power upper limit value.

2. The vehicle according to claim 1, wherein:
the first control device is configured to use the detection value of the battery sensor to obtain the first current upper limit value;
the second control device is configured to control the input power of the secondary battery such that the input power of the secondary battery does not exceed the first power upper limit value;
the options include a first conversion formula and a second conversion formula, the first conversion formula being a formula for converting the first current upper limit value into the first power upper limit value by multiplying a measured value of a voltage of the secondary battery by the first current upper limit value, the voltage being detected by the battery sensor, and the second conversion formula being a formula for converting the first current upper limit value into the first power upper limit value by multiplying a first estimated voltage value by the first current upper limit value, the first estimated voltage value being a voltage value of the secondary battery in a state in which a current corresponding to the first current upper limit value is flowing through the secondary battery; and
the converter is configured to select the second conversion formula when the state of the secondary battery is included in a predetermined first state, and select the first conversion formula when the state of the secondary battery is not included in the predetermined first state.

3. The vehicle according to claim 1, wherein:
the first control device is configured to use the detection value of the battery sensor to obtain the second current upper limit value;
the second control device is configured to control the output power of the secondary battery such that the output power of the secondary battery does not exceed the second power upper limit value;
the options include a third conversion formula and a fourth conversion formula, the third conversion formula being a formula for converting the second current upper limit value into the second power upper limit value by multiplying a measured value of a voltage of the secondary battery by the second current upper limit value, the voltage being detected by the battery sensor, and the fourth conversion formula being a formula for converting the second current upper limit value into the second power upper limit value by multiplying a second estimated voltage value by the second current upper limit value, the second estimated voltage value being a voltage value of the secondary battery in a state in which a current corresponding to the second current upper limit value is flowing through the secondary battery; and
the converter is configured to select the fourth conversion formula when the state of the secondary battery is included in a predetermined second state, and select the third conversion formula when the state of the secondary battery is not included in the predetermined second state.

4. The vehicle according to claim 1, further comprising a third control device provided separately from the battery pack and configured to relay communication between the first control device and the second control device, wherein:
the converter is mounted on the third control device;
the battery pack is configured to output at least one of the first current upper limit value and the second current upper limit value;
the third control device is configured such that when at least one of the first current upper limit value and the second current upper limit value is input from the battery pack to the third control device, the converter performs the conversion of at least one of the first current upper limit value and the second current upper limit value into at least one of the first power upper limit value and the second power upper limit value; and
the third control device is configured to output at least one of the first power upper limit value and the second power upper limit value to the second control device.

5. The vehicle according to claim 4, wherein the third control device is configured to perform the conversion and output at least one of the first power upper limit value and the second power upper limit value when at least one of the first current upper limit value and the second current upper limit value is input, and to output at least one of the first power upper limit value and the second power upper limit value without performing the conversion when at least one of the first power upper limit value and the second power upper limit value is input.

6. The vehicle according to claim 1, wherein:
the converter is mounted on the first control device; and
the first control device is configured to perform, with the converter, the conversion of at least one of the first current upper limit value and the second current upper limit value obtained using the detection value of the battery sensor into at least one of the first power upper limit value and the second power upper limit value to output the at least one of the first power upper limit value and the second power upper limit value that has been obtained to the second control device when the first control device is connected to the second control device.

7. The vehicle according to claim 1, wherein:
the converter is mounted on the second control device;
the battery pack is configured to output at least one of the first current upper limit value and the second current upper limit value; and
the second control device is configured to perform, with the converter, the conversion of at least one of the first current upper limit value and the second current upper limit value that is input from the battery pack into at least one of the first power upper limit value and the second power upper limit value and to use the at least one of the first power upper limit value and the second power upper limit value that has been obtained to control at least one of the input power of the secondary battery and the output power of the secondary battery.

8. A vehicle control system configured such that a battery pack is attached to the vehicle control system, the battery pack including a secondary battery, a battery sensor configured to detect a state of the secondary battery, and a control device configured to use a detection value of the battery sensor to obtain at least one of a first current upper limit value indicating an upper limit value of an input current of the secondary battery and a second current upper limit value indicating an upper limit value of an output current of the secondary battery, the vehicle control system comprising:
a control unit configured to use at least one of a first power upper limit value indicating an upper limit value of an input power of the secondary battery and a second power upper limit value indicating an upper limit value of an output power of the secondary battery to control at least one of the input power of the secondary battery and the output power of the secondary battery when the battery pack is attached to the vehicle control system; and
a conversion unit configured to select a conversion formula from options depending on a situation and to use the conversion formula that has been selected to perform conversion of at least one of the first current upper limit value and the second current upper limit value that is input from the battery pack into at least one of the first power upper limit value and the second power upper limit value, and to output at least one of the first power upper limit value and the second power upper limit value that has been obtained to the control unit.

9. A vehicle control method comprising:
acquiring, with a vehicle control system to which a battery pack is attached, at least one of a first current upper limit value indicating an upper limit value of an input current of a secondary battery and a second current upper limit value indicating an upper limit value of an output current of the secondary battery from the battery pack, the battery pack including the secondary battery, a battery sensor configured to detect a state of the secondary battery, and a control device configured to use a detection value of the battery sensor to obtain at least one of the first current upper limit value and the second current upper limit value;
selecting, with the vehicle control system, a conversion formula from options;
performing, with the vehicle control system, conversion of at least one of the first current upper limit value and the second current upper limit value that has been acquired from the battery pack into at least one of a first power upper limit value indicating an upper limit value of an input power of the secondary battery and a second power upper limit value indicating an upper limit value of an output power of the secondary battery using the conversion formula that has been selected; and
controlling, with the vehicle control system, at least one of an input power of the secondary battery and an output power of the secondary battery using at least one of the first power upper limit value and the second power upper limit value.

* * * * *